(12) United States Patent
Sugimura et al.

(10) Patent No.: US 10,449,830 B2
(45) Date of Patent: Oct. 22, 2019

(54) VEHICULAR HEAT MANAGEMENT SYSTEM

(71) Applicant: DENSO CORPORATION, Kariya, Aichi-pref. (JP)

(72) Inventors: Kengo Sugimura, Kariya (JP); Kazutoshi Kuwayama, Kariya (JP); Masamichi Makihara, Kariya (JP); Yoshiki Katoh, Kariya (JP); Norihiko Enomoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 630 days.

(21) Appl. No.: 14/894,549

(22) PCT Filed: May 22, 2014

(86) PCT No.: PCT/JP2014/002679
§ 371 (c)(1),
(2) Date: Nov. 30, 2015

(87) PCT Pub. No.: WO2014/196138
PCT Pub. Date: Dec. 11, 2014

(65) Prior Publication Data
US 2016/0101666 A1 Apr. 14, 2016

(30) Foreign Application Priority Data

Jun. 4, 2013 (JP) .................................. 2013-117550
Jun. 25, 2013 (JP) .................................. 2013-132276

(51) Int. Cl.
*B60H 1/22* (2006.01)
*B60H 1/00* (2006.01)
(Continued)

(52) U.S. Cl.
CPC ........... *B60H 1/22* (2013.01); *B60H 1/00785* (2013.01); *B60H 1/00899* (2013.01);
(Continued)

(58) Field of Classification Search
CPC .. B60H 1/22; B60H 1/00785; B60H 1/00899; B60H 1/321; B60H 1/3213;
(Continued)

(56) References Cited

U.S. PATENT DOCUMENTS 4,061,186 A 12/1977 Ljung
5,421,169 A 6/1995 Benedict
(Continued)

FOREIGN PATENT DOCUMENTS

EP 2174810 A2 4/2010
JP H06219150 A 8/1994
(Continued)

OTHER PUBLICATIONS

English translation of JPH11301254 Hiro Hisatoshi.*
(Continued)

*Primary Examiner* — Joel M Attey
(74) *Attorney, Agent, or Firm* — Harness, Dickey & Pierce, P.L.C.

(57) ABSTRACT

A vehicular heat management system includes: a refrigerant circuit; a first heat medium circuit in which a heat medium circulates and exchanges heat with a low-pressure side refrigerant of the refrigerant circuit; a second heat medium circuit in which a heat medium circulates and exchanges heat with a high-pressure side refrigerant of the refrigerant circuit; and a switching device configured to switch a mode between a communicating mode in which the first heat medium circuit and the second heat medium circuit are coupled and a non-communicating mode in which the first heat medium circuit and the second heat medium circuit are
(Continued)

not coupled on the basis of a temperature of the heat medium in the first heat medium circuit.

24 Claims, 10 Drawing Sheets

(51) Int. Cl.
  *B60H 1/32* (2006.01)
  *B60K 6/22* (2007.10)
  *B60L 50/16* (2019.01)
(52) U.S. Cl.
  CPC ............ *B60H 1/321* (2013.01); *B60H 1/3213* (2013.01); *B60K 6/22* (2013.01); *B60L 50/16* (2019.02); *B60H 2001/00928* (2013.01); *B60H 2001/00961* (2019.05); *B60H 2001/224* (2013.01); *B60H 2001/2271* (2013.01); *Y02T 10/70* (2013.01); *Y02T 10/7077* (2013.01); *Y02T 90/16* (2013.01)
(58) Field of Classification Search
  CPC .... B60H 2001/00928; B60H 2001/224; B60H 2001/2271; B60K 6/22
  USPC ........................................................ 165/202
  See application file for complete search history.

(56) References Cited

U.S. PATENT DOCUMENTS

| | | | | |
|---|---|---|---|---|
| 6,866,094 | B2* | 3/2005 | Cousineau | ........... B23Q 11/126 118/724 |
| 2003/0230094 | A1* | 12/2003 | Takano | ............. B60H 1/00785 62/150 |
| 2004/0035130 | A1 | 2/2004 | Amaral et al. | |
| 2004/0050086 | A1 | 3/2004 | Amaral et al. | |
| 2004/0050089 | A1 | 3/2004 | Amaral | |
| 2004/0089003 | A1 | 5/2004 | Amaral et al. | |
| 2004/0089014 | A1 | 5/2004 | Amaral et al. | |
| 2005/0097917 | A1* | 5/2005 | Hanada | ............... B60H 1/00885 62/434 |
| 2010/0281901 | A1* | 11/2010 | Kawase | ............. B60H 1/00885 62/238.7 |
| 2011/0197611 | A1* | 8/2011 | Hall | ................... B60H 1/00378 62/238.7 |
| 2013/0291577 | A1* | 11/2013 | Miyakoshi | ......... B60H 1/00392 62/151 |
| 2014/0060101 | A1* | 3/2014 | Styles | ................ B60H 1/00899 62/238.6 |
| 2014/0245777 | A1* | 9/2014 | Katoh | ................... F28F 9/0204 62/515 |
| 2014/0318170 | A1 | 10/2014 | Katoh et al. | |
| 2015/0000327 | A1 | 1/2015 | Kakehashi et al. | |

FOREIGN PATENT DOCUMENTS

| | | |
|---|---|---|
| JP | H11200858 A | 7/1999 |
| JP | H11301254 A | 11/1999 |
| JP | 2003533396 A | 11/2003 |
| JP | 2004189213 A | 7/2004 |
| JP | 2006051852 A | 2/2006 |
| JP | 2010260449 A | 11/2010 |
| JP | 2012505796 A | 3/2012 |
| JP | 2012225638 A | 11/2012 |
| JP | 2013052877 A | 3/2013 |

OTHER PUBLICATIONS

International Search Report and Written Opinion (in Japanese with English Translation) for PCT/JP2014/002679, dated Aug. 12, 2014; ISA/JP.

* cited by examiner

VEHICULAR HEAT MANAGEMENT SYSTEM

CROSS REFERENCE TO RELATED APPLICATIONS

This application is a U.S. National Phase Application under 35 U.S.C. 371 of International Application No. PCT/JP2014/002679 filed on May 22, 2014 and published in Japanese as WO 2014/196138 A1 on Dec. 11, 2014. This application is based on and claims the benefit of priority from Japanese Patent Applications No. 2013-117550 filed on Jun. 4, 2013, and No. 2013-132276 filed on Jun. 25, 2013. The entire disclosures of all of the above applications are incorporated herein by reference.

TECHNICAL FIELD

This disclosure relates to a heat management system that is used in a vehicle.

BACKGROUND ART

In the related art, Patent Document 1 describes a vehicle air conditioning apparatus including a high-pressure side heat exchanger (interior condenser) that causes a high-temperature and high-pressure refrigerant discharged from a compressor in a refrigeration cycle to be heat-exchanged with blast air blown into the vehicle interior, and a low-pressure side heat exchanger (exterior heat exchanger) that causes a low-temperature and low-pressure refrigerant decompressed and expanded by an expansion valve in the refrigeration cycle to be heat-exchanged with outside air.

In the related art, in the low-pressure side heat exchanger, a refrigerant absorbs heat from the outside air, and in the high-pressure side heat exchanger, the refrigerant discharge heat to the blast air in the vehicle interior. Accordingly, heat of the outside air is pumped and the blast air blown into the vehicle interior is heated. In other words, air heating is achieved by a heat pump cycle.

In the related art mentioned above, a high-pressure side refrigerant in the refrigeration cycle and the blast air into the vehicle interior are caused to be heat-exchanged in the interior condenser. Therefore, when the refrigerant leaks in the interior condenser, the refrigerant may leak into the vehicle interior.

In the related art mentioned above, since the introduction of the outside air into the exterior heat exchanger is required, the exterior heat exchanger is disposed at the foremost portion of a vehicle. Therefore, even by a light collision of the vehicle, the exterior heat exchanger may be destroyed and the refrigerant may be released to the atmosphere.

PRIOR ART DOCUMENT

Patent Document

Patent Document 1: JP 2013-052877 A

SUMMARY OF THE INVENTION

In view of such points mentioned above, it is an objective of the present disclosure to provide a vehicular heat management system capable of preventing a refrigerant from being released to the atmosphere.

It is another objective of the present disclosure to provide a vehicular heat management system capable of preventing the refrigerant from leaking into the vehicle interior.

It is another objective of the present disclosure is to reliably obtain a heat for melting frost adhered to a heat-absorption heat exchanger in the vehicular heat management system that is configured to perform heat exchange in the heat-absorption heat exchanger between a heat medium cooled by a low-pressure side heat exchanger and air.

It is still further objective of the present disclosure to provide the vehicular heat management system in which excessive reduction of temperature of the heat medium can be limited.

According to a first aspect of the present disclosure, a vehicular heat management system includes a low-pressure side heat exchanger configured to cool a heat medium by heat exchange between a low-pressure side refrigerant of a refrigeration cycle and the heat medium, a first heat medium circuit in which the heat medium cooled by the low-pressure side heat exchanger circulates, a high-pressure side heat exchanger configured to heat a heat medium by heat exchange between the high-pressure side refrigerant of the refrigeration cycle and the heat medium, a second heat medium circuit in which the heat medium heated by the high-pressure side heat exchanger circulates, and a switching device configured to switch a mode between a communicating mode in which the first heat medium circuit and the second heat medium circuit are coupled and a non-communicating mode in which the first heat medium circuit and the second heat medium circuit are not coupled. The switching device selects the communicating mode when a temperature of the heat medium that flows in the first heat medium circuit is lower than a first predetermined temperature. The switching device selects the non-communicating mode when the temperature of the heat medium that flows in the first heat medium circuit is higher than or equal to a second predetermined temperature.

Therefore, since the temperature of the heat medium flowing in the first heat medium circuit can be maintained to a level higher than or equal to a first predetermined temperature, excessive reduction of the temperature of the heat medium can be restricted.

According to a second aspect of the present disclosure, a vehicular heat management system includes a compressor configured to draw and discharge a refrigerant, a high-pressure side heat exchanger configured to heat a first heat medium by heat exchange between the refrigerant discharged from the compressor and the first heat medium, a decompression device configured to decompress the refrigerant heat-exchanged in the high-pressure side heat exchanger, a low-pressure side heat exchanger configured to cool a second heat medium by heat exchange between the refrigerant decompressed in the decompression device and the second heat medium, a heat-absorption heat exchanger that causes the second heat medium to absorb heat by heat exchange between the second heat medium cooled by the low-pressure side heat exchanger and air, an introducing portion configured to introduce a heat amount of the first heat medium heated by the high-pressure side heat exchanger into the heat-absorption heat exchanger, and a heat-medium temperature adjusting device configured to determine whether frost is adhered to the heat-absorption heat exchanger and increase the temperature of the first heat medium heated by the high-pressure side heat exchanger when it is determined that frost is adhered to the heat-absorption heat exchanger.

In the heat-absorption heat exchanger, a second heat medium and air exchange heat with each other. Therefore, even though the heat-absorption heat exchanger is destroyed by a collision accident or the like of the vehicle, the refrigerant is prevented from being released to the atmosphere. When it is determined that frost is adhered to the heat-absorption heat exchanger, the temperature of the first heat medium is increased. Hence, the heat amount of the first heat medium can be introduced reliably to the heat-absorption heat exchanger. Therefore, a heat for melting the frost adhered to the heat-absorption heat exchanger can be reliably obtained.

EMBODIMENTS FOR EXPLOITATION OF THE INVENTION

Figure 1:
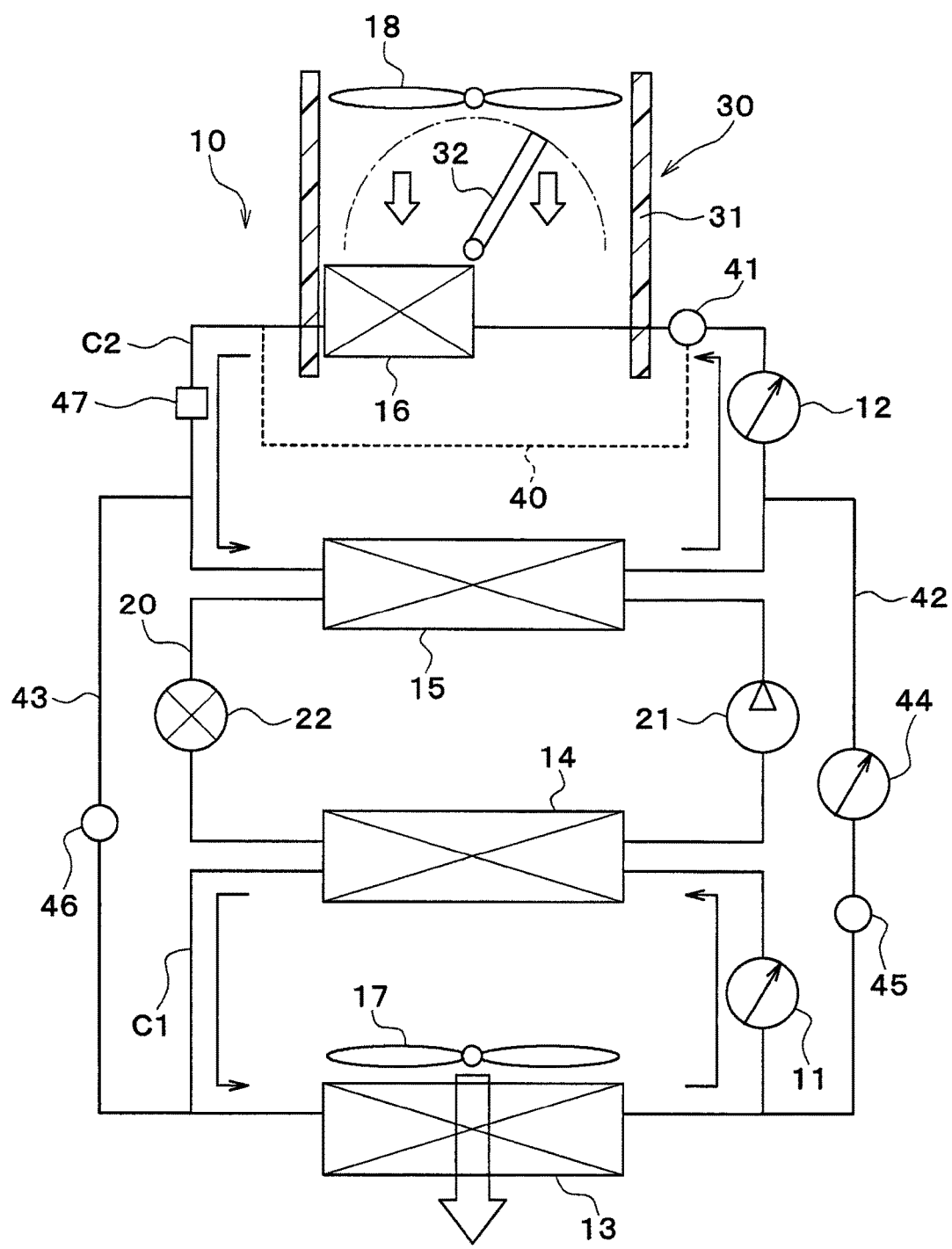
FIG. 1 is a schematic diagram illustrating a non-communicating mode of a vehicular heat management system according to a first embodiment of the present disclosure.

The present inventors study the vehicular heat management system (hereinafter, a study example) including an exterior evaporator (low-pressure side heat exchanger) that cools a coolant by causing a low-pressure side refrigerant of a refrigeration cycle to be heat-exchanged with the coolant; a first coolant circuit in which the coolant cooled by the exterior evaporator circulates; an exterior condenser (high-pressure side heat exchanger) that heats the coolant by causing a high-pressure side refrigerant of the refrigeration cycle to be heat-exchanged with the coolant; a second coolant circuit in which the coolant heated by the exterior condenser circulates; an exterior heat exchanger (heat-absorption heat exchanger) that causes the coolant circulating in the first coolant circuit to be heat-exchanged with outside air to cause the coolant to absorb heat from the outside air; and a heater core (air-heating heat exchanger) that causes the coolant circulating in the second coolant circuit to be heat-exchanged with blast air blown into a vehicle interior to heat the blast air blown into the vehicle interior.

In this study example, the coolant is made of ethylene glycol-based antifreeze (LLC).

According to this study example, the high-pressure side refrigerant of the refrigeration cycle exchanges heat with the coolant in the exterior condenser, and hence in the case where the refrigerant leaks in the exterior condenser, the refrigerant is prevented from leaking into the vehicle interior. Since the heat exchange between the coolant in the refrigeration cycle and outside air takes place in the exterior heat exchanger, in the case where the exterior heat exchanger is destroyed due to a collision accident or the like of the vehicle, the refrigerant is prevented from being released into the atmosphere.

In this study example, when the temperature of the coolant cooled by the low-pressure side heat exchanger reaches a temperature below zero degree, water content in the outside air coagulates on the surface of the heat-absorption heat exchanger and frost formation (frost) develops. Consequently, an outside air passage of the heat-absorption heat exchanger is clogged, and a flow rate of the outside air is lowered, and hence an amount of heat absorption is lowered.

As a countermeasure for this, melting the frost by introducing heat that high-temperature and high-pressure refrigerant discharged from the compressor has into the heat-absorption heat exchanger is conceivable. However, the heat amount required for melting the frost adhered to the heat-absorption heat exchanger varies depending on the outside air temperature and the amount of adhered frost or the like. Therefore, it may become difficult to reliably obtain heat for melting the frost adhered to the heat-absorption heat exchanger.

In this study example, the temperature of the coolant cooled by the exterior evaporator may become that of the outside air or even lower. When the temperature of the coolant becomes that of the outside air or lower, the viscosity of the coolant obviously increases, and hence a pressure loss of the coolant is increased which leads to a decrease of the flow rate of the coolant.

When the flow rate of the coolant decreases, further decrease of the temperature of the coolant may result (detailed description will be given later). At this time, when an attempt is made to maintain the flow rate of the coolant, an increase in power for circulating the coolant may result.

When the temperature of the coolant cooled by the exterior evaporator reaches a temperature below zero degree, water content in the outside air coagulates in the exterior heat exchanger and frost formation (frost) develops. According to the perception found by the inventors through experiments, it was found that when the frost formation develops in the exterior heat exchanger, further lowering of the temperature of the coolant may result.

When the further lowering of the temperature of the coolant occurs, the temperature of the coolant may be lowered to a level below a freezing point, so that the coolant may be coagulated.

This may occur also in the case where various heat medium are used instead of the coolant.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A vehicular heat management system 10 (refrigeration cycle device) shown in FIG. 1 is used to appropriately adjust temperatures of various devices provided in a vehicle and a vehicle interior. In the present embodiment, the vehicular heat management system 10 is applied to a hybrid vehicle that obtains a drive force for the traveling of the vehicle from an engine (internal combustion engine) and a traveling electric motor.

The hybrid vehicle of the present embodiment is formed as a plug-in hybrid vehicle that can charge a battery (in-vehicle battery), which is mounted on the vehicle, with an electric power that is supplied from an external power supply (commercial power supply) at a time when the vehicle stops. For example, a lithium-ion battery can be used as the battery.

The drive force, which is output from the engine, is not only used for the traveling of the vehicle, and but also used for the operation of a generator. Further, an electric power generated by a generator and an electric power supplied from the external power supply can be stored in the battery, and the power stored in the battery is supplied to not only the traveling electric motor but also various vehicle-mounted devices including electric components configuring the vehicular heat management system 10.

As illustrated in FIG. 1, the vehicular heat management system 10 includes a first pump 11, a second pump 12, a radiator 13, a coolant cooler 14, a coolant heater 15, and a heater core 16.

The first pump 11 and the second pump 12 are coolant pumps that draw and discharge a coolant (heat medium), and are composed of electric pumps. The coolant is a fluid serving as a heat medium. In the present embodiment, the coolant can be a liquid containing at least ethylene glycol, dimethylpolysiloxane or nanofluid, or antifreeze material.

The radiator 13, the coolant cooler 14, the coolant heater 15, and the heater core 16 are coolant circulation equipment (heat medium circulation equipment) in which the coolant flows.

The radiator 13 is a coolant-outside air heat exchanger (heat medium-outside air heat exchanger) that exchanges heat between the coolant and outside air (air outside of the vehicle interior). Outside air is blown by an exterior blower 17 to the radiator 13. The exterior blower 17 is a blowing apparatus that blows the outside air to the radiator 13. The exterior blower 17 is an electric blower that drives a blower fan with an electric motor (blower motor).

The radiator 13 and the exterior blower 17 are disposed in a foremost portion of the vehicle. For that reason, a traveling wind can be applied to the radiator 13 when the vehicle travels.

In the case where a coolant that flows in the radiator 13 has a lower temperature than the outside air, the radiator 13 may be used as an example of the heat-absorption heat exchanger that causes the coolant to absorb heat of the outside air. In the case where the coolant that flows in the radiator 13 has a higher temperature than the outside air, the radiator 13 functions as a radiation heat exchanger that discharges heat of the coolant to the outside air.

The coolant cooler 14 may be used as an example of a low-pressure side heat exchanger (heat medium cooler) that cools the coolant by exchanging heat between a low-pressure side refrigerant of a refrigerant circuit 20 (refrigeration cycle) and the coolant. The coolant cooler 14 is capable of cooling the coolant to a lower temperature than the temperature of the outside air.

The coolant heater 15 may be used as an example of a high-pressure side heat exchanger (heat medium heater) that heats the coolant by exchanging heat between a high-pressure side refrigerant of the refrigerant circuit 20 and the coolant. In other words, the coolant heater 15 may be used as an example of the high-pressure side heat exchanger (refrigerant cooler) that cools the high-pressure side coolant by exchanging heat between the high-pressure side refrigerant of the refrigerant circuit 20 and the coolant.

The refrigerant circuit 20 is a vapor compression type freezer provided with a compressor 21, the coolant heater 15, an expansion valve 22, and the coolant cooler 14. The refrigerant circuit 20 of the present embodiment uses a fluorocarbon refrigerant as the refrigerant, and configures a subcritical refrigeration cycle in which a high pressure-side refrigerant pressure does not exceed a critical pressure of the refrigerant.

The compressor 21 is an electric compressor that is driven by electric power supplied from a battery, or a variable capacity compressor driven by a belt, and draws and discharges the refrigerant in the refrigerant circuit 20 in a compressed state.

The coolant heater 15 is a condenser that condenses a high-pressure side refrigerant by exchanging heat between the high pressure side refrigerant discharged from the compressor 21 and the coolant. The expansion valve 22 may be used as an example of a decompression apparatus that decompresses and expands liquid-phase refrigerant flowed out from the coolant heater 15.

The coolant cooler 14 is an evaporator that evaporates a low-pressure refrigerant by exchanging heat between the low-pressure refrigerant decompressed and expanded by the expansion valve 22 and the coolant. A gas-phase refrigerant evaporated by the coolant cooler 14 is drawn into the compressor 21, and compressed.

The heater core 16 may be used as an example of an air-heating heat exchanger (air heater, coolant-air heat exchanger) that heats the blast air blown into the vehicle interior by exchanging heat between the coolant and the blast air blown into the vehicle interior. In other words, the heater core 16 may be used as an example of the air-heating heat exchanger that heats air by using at least part of the heat amount of the refrigerant discharged from the compressor 21. In this manner, the refrigerant in the refrigerant circuit 20 does not exchange heat directly with the blast air blown into the vehicle interior, but exchanges heat with the blast air via the coolant, so that leakage of the refrigerant into the vehicle interior is prevented.

Inside air (air in the vehicle interior), outside air, or inside-outside air mixture is blown to the heater core 16 by an interior blower 18.

The interior blower 18 is a blowing apparatus that blows air toward the vehicle interior. The interior blower 18 is an electric blower that drives a centrifugal multi-blade fan (sirocco fan) with an electric motor (blower motor). The interior blower 18 may be used as an example of an air flow rate adjusting device that adjust the flow rate of air that passes through the heater core 16.

The heater core 16 and the interior blower 18 are stored in a casing 31 of an interior air conditioning unit 30 of a vehicle air conditioning apparatus. The interior air conditioning unit 30 is disposed inside a dashboard panel (instrument panel) of the foremost portion of the vehicle interior. The casing 31 forms an outline of the interior air conditioning unit.

The casing 31 forms an air passage of the blast air which is blown into the vehicle interior, and is made of a resin (for example, polypropylene) having some degree of elasticity and is excellent in strength.

An air mix door 32 is disposed in the interior of the casing 31. The air mix door 32 may be used as an example of a blow-out air temperature adjusting apparatus (air ratio adjusting apparatus) that adjusts the temperature of the blown out air blown into the vehicle interior by adjusting the ratio between the flow rate of the air flowing in the heater core 16 and the flow rate of air flowing by bypassing the heater core 16. The air mix door 32 may be used as an example of the above-mentioned air flow rate adjusting device that adjusts the flow rate of air that passes through the heater core 16.

The air mix door 32 is a rotatably plate-shaped door, a slidable door and the like and is driven by an electric actuator (not illustrated).

In the interior of the casing 31, a cooler core (air cooler) that cools the blast air blown into the vehicle interior may be disposed on the upstream side of the air flow with respect to the air mix door 32 and the heater core 16.

The first pump 11, the radiator 13, and the coolant cooler 14 are disposed in a first coolant circuit C1 (first heat medium circuit). The first coolant circuit C1 is configured to cause the coolant (second heat medium) to circulate from the first pump 11→the coolant cooler 14→radiator 13→first pump 11 in this order.

The second pump 12, the coolant heater 15, and the heater core 16 are disposed in a second coolant circuit C2 (second heat medium circuit). The second coolant circuit C2 is configured to cause the coolant (first heat medium) to circulate from the second pump 12→heater core 16→coolant heater 15→the second pump 12 in this order.

A bypass channel 40 is connected with second coolant circuit C2. The bypass channel 40 is a bypass member that makes coolant flow in the second coolant circuit C2 with bypassing the heater core 16.

A three-way valve 41 is disposed at a portion of the second coolant circuit C2 to which the bypass channel 40 is connected. The three-way valve 41 is a coolant ratio adjusting apparatus (heat medium ratio adjusting apparatus) configured to adjust the ratio between the flow rate of the coolant that flows in the heater core 16 and the flow rate of the coolant that flows in the bypass channel 40, and for example, includes an electromagnetic valve.

A first communicating flow channel 42 and a second communicating flow channel 43 are connected to the first coolant circuit C1 and the second coolant circuit C2. The first communicating flow channel 42 and the second communicating flow channel 43 are communication portions for communicating a coolant flow channel of the first coolant circuit C1 with a coolant flow channel of the second coolant circuit C2.

One end of the first communicating flow channel 42 is connected to the first coolant circuit C1 at a portion on a coolant outlet side of the radiator 13 and a coolant intake side of the first pump 11. The other end of the first communicating flow channel 42 is connected to a portion of the second coolant circuit C2 on the coolant outlet side of the coolant heater 15 and a portion of the second pump 12 on the coolant intake side.

One end of the second communicating flow channel 43 is connected to the first coolant circuit C1 at a portion on the coolant outlet side of the coolant cooler 14 and the coolant inlet side of the radiator 13. The other end of the second communicating flow channel 43 is connected to the second coolant circuit C2 at a portion on the coolant outlet side of the heater core 16 and the coolant inlet side of the coolant heater 15.

A third pump 44 is disposed in the first communicating flow channel 42. The third pump 44 is a coolant pump that draws and discharges the coolant (heat medium) of the first communicating flow channel 42, and is composed of an electric pump.

A first on/off valve 45 is disposed in the first communicating flow channel 42. A second on/off valve 46 is disposed in the second communicating flow channel 43.

The first on/off valve 45 is an opening/closing device that opens and closes the first communicating flow channel 42, and is composed of, for example, an electromagnetic valve. The second on/off valve 46 is an opening/closing device that opens and closes the second communicating flow channel 43, and is composed of, for example, an electromagnetic valve. The first on/off valve 45 and the second on/off valve 46 may be used as an example of a switching device that switches a non-communicating mode illustrated in FIG. 1 and a communicating mode illustrated in FIG. 2.

In the non-communicating mode, the first on/off valve 45 and the second on/off valve 46 close the first communicating flow channel 42 and the second communicating flow channel 43. Accordingly, the coolant flow channel of the first coolant circuit C1 and the coolant flow channel of the second coolant circuit C2 do not communicate with each other.

In the communicating mode, the first on/off valve 45 and the second on/off valve 46 open the first communicating flow channel 42 and the second communicating flow channel 43. Accordingly, the coolant flow channel of the first coolant circuit C1 and the coolant flow channel of the second coolant circuit C2 communicate with each other. In addition, in the communicating mode, the third pump 44 is operated.

Accordingly, the coolant circulates from the third pump 44→the coolant heater 15 and the heater core 16 (parallel flow)→radiator 13 and the coolant cooler 14 (parallel flow)→the third pump 44 in this order. In the communicating mode, the first pump 11 and the second pump 12 may be stopped.

In the communicating mode, the coolant heated by the coolant heater 15 of the second coolant circuit C2 is introduced into the radiator 13 of the first coolant circuit C1. Therefore, frost adhered to the radiator 13 may be melted (frost may be removed) by using the coolant heated by the coolant heater 15.

The first coolant circuit C1 includes an electric heater 47 disposed therein. The electric heater 47 may be used as an example of a heat supply device that supplies heat to the coolant, and is a heat generating device that generates heat by being supplied with electric power. The heat amount generated by the electric heater 47 (in other words, an amount of an electric energy supplied to the electric heater 47) is controlled by a controller 50.

In the non-communicating mode, the coolant heated by the heat amount generated by the electric heater 47 is introduced into the heater core 16 and is used for heating. In the communicating mode, the coolant heated by the heat amount generated by the electric heater 47 is introduced into the radiator 13 of the first coolant circuit C1 and is used for frost removal.

Figure 3:
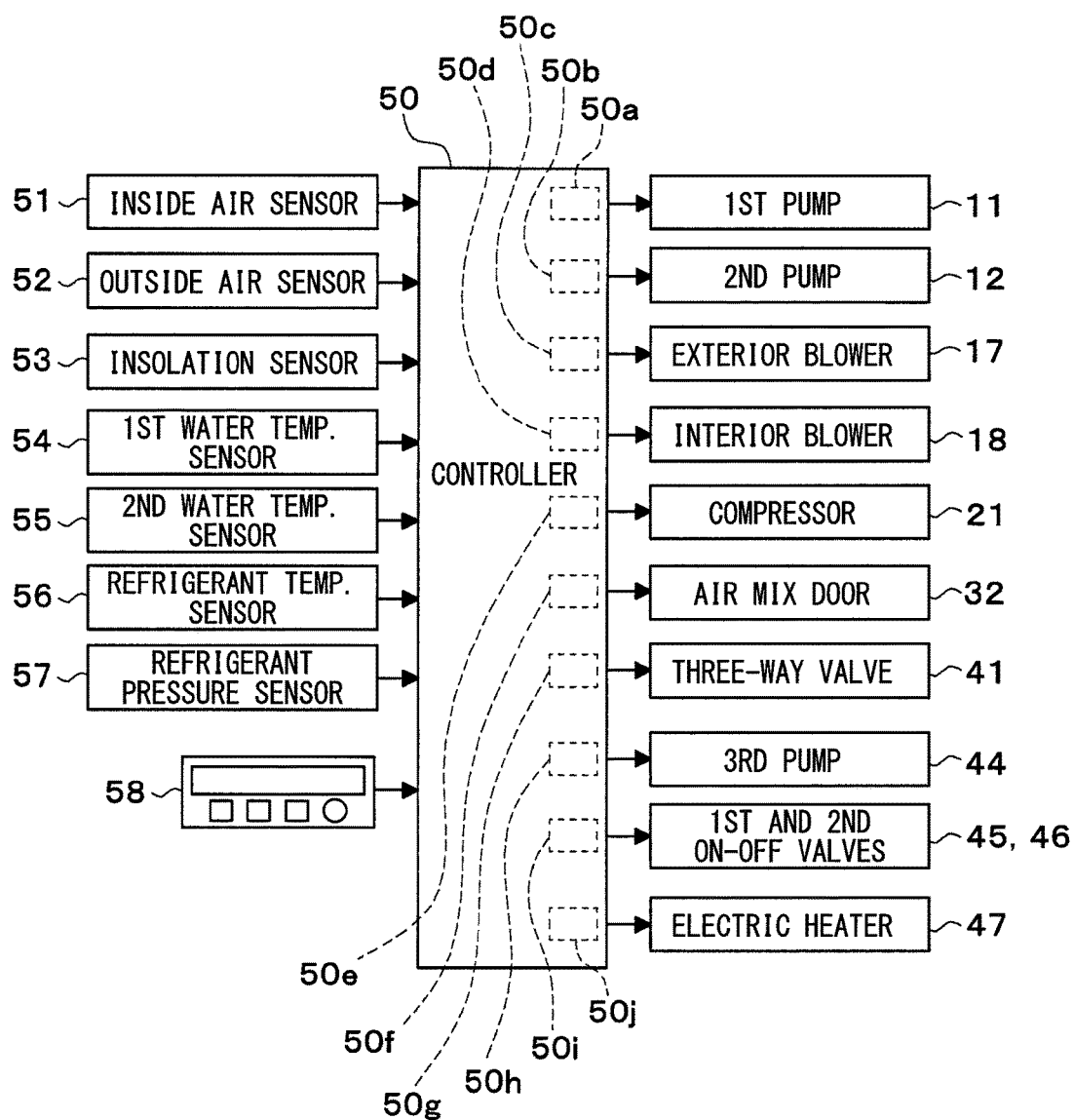
FIG. 3 is a diagram illustrating an electronic control unit in the vehicular heat management system according to the first embodiment.

The controller 50 illustrated in FIG. 3 includes a known microcomputer including a CPU, a ROM, and a RAM and peripheral circuits thereof, and is configured to perform various computations and processes on the basis of an air-conditioning control program memorized in the ROM. The controller 50 controls operations of the first pump 11, the second pump 12, the exterior blower 17, the interior blower 18, the compressor 21, the air mix door 32, the three-way valve 41, the third pump 44, the first on/off valve 45, the second on/off valve 46, the electric heater 47 and the like connected on the output side.

The controller 50 is integrated with a control unit that controls various control target devices connected to the output side of the controller 50, but a configuration for controlling the operations of the respective apparatuses to be controlled (hardware and software) forms constitutes part of a control unit that controls the operations of the respective apparatuses to be controlled.

A configuration of the controller 50 which controls the operation of the first pump 11 (hardware and software) constitutes part of a first coolant flow rate control unit 50a (first heat medium flow rate control unit).

A configuration of the controller 50 which controls the operation of the second pump 12 (hardware and software) constitutes part of a second coolant flow rate control unit 50b (second heat medium flow rate control unit).

A configuration of the controller 50 which controls the operation of the exterior blower 17 (hardware and software) constitutes part of an exterior blower control unit 50c.

A configuration of the controller 50 which controls the operation of the interior blower 18 (hardware and software) constitutes part of an interior blower control unit 50d.

A configuration of the controller 50 which controls the operation of the compressor 21 (hardware and software) constitutes part of a refrigerant flow rate control unit 50e.

A configuration of the controller 50 which controls the operation of the air mix door 32 (hardware and software) constitutes part of an air mix door control unit 50f (air flow rate ratio control unit).

A configuration of the controller 50 which controls the operation of the three-way valve 41 (hardware and software) constitutes part of a bypass switching control unit 50g.

A configuration of the controller 50 which controls the operation of the third pump 44 (hardware and software) constitutes part of a third coolant flow rate control unit 50h (third heat medium flow rate control unit).

A configuration of the controller 50 which controls the operation of the first on/off valve 45 and the second on/off valve 46 (hardware and software) constitutes part of an on/off valve control unit 50i. The on/off valve control unit 50i may be used as an example of the above-mentioned switching device that switches a non-communicating mode and a communicating mode.

A configuration of the controller 50 which controls the operation of the electric heater 47 (hardware and software) constitutes part of an electric heater control unit 50j. The electric heater control unit 50j constitutes a quantity-of-heat increasing portion that increases the heat amount generated by the electric heater 47.

The first coolant flow rate control unit 50a, the second coolant flow rate control unit 50b, the exterior blower control unit 50c, the interior blower control unit 50d, the refrigerant flow rate control unit 50e, the air mix door control unit 50f, the bypass switching control unit 50g, the third coolant flow rate control unit 50h, the on/off valve control unit 50i, and the electric heater control unit 50j may be provided separately from the controller 50.

Detection signals of various sensors such as an inside air sensor 51, an outside air sensor 52, an insolation sensor 53, a first water temperature sensor 54, a second water temperature sensor 55, a refrigerant temperature sensor 56, and a refrigerant pressure sensor 57, and the like are input to an input side of the controller 50.

The inside air sensor 51 is a detecting device (inside air temperature detecting device) that detects the inside temperature (vehicle interior temperature). The outside air sensor 52 is a detecting device (outside air temperature detecting device) that detects the outside temperature (vehicle exterior temperature). The insolation sensor 53 is a detecting device (quantity of solar radiation detecting device) that detects the amount of insolation in the vehicle interior).

The first water temperature sensor 54 is a detecting device (first heat medium temperature detecting device) configured to detect a temperature TW1 of the coolant that flows in the first coolant circuit C1. The temperature TW1 of the coolant that flows in the first coolant circuit C1 detected by the first water temperature sensor 54 is a temperature of the coolant flowed out from the coolant cooler 14, for example, the temperature of the coolant drawn into the first pump 11, and the like.

The second water temperature sensor 55 is a detecting device (second heat medium temperature detecting device) configured to detect a temperature TW2 of the coolant that flows in the second coolant circuit C2. The temperature TW2 of the coolant that flows in the second coolant circuit C2 detected by the second water temperature sensor 55 is a temperature of the coolant flowed out from the coolant heater 15, for example, the temperature of the coolant drawn into the second pump 12, and the like.

The refrigerant temperature sensor 56 may be used as an example of a detecting device (refrigerant temperature detecting device) that detects the temperature of the refrigerant in the refrigerant circuit 20. The refrigerant temperature of the refrigerant circuit 20 detected by the refrigerant temperature sensor 56 is, for example, the temperature of the high-pressure side refrigerant discharged from the compressor 21, the temperature of the low-pressure side refrigerant drawn into the compressor 21, the temperature of the low-pressure side refrigerant decompressed and expanded by the expansion valve 22, the temperature and the like of the low-pressure side refrigerant heat-exchanged in the coolant cooler 14.

The refrigerant pressure sensor 57 may be used as an example of a detecting device (refrigerant pressure detecting device) that detects the refrigerant pressure (for example, the pressure of the high-pressure side refrigerant discharged from the compressor 21 or the pressure of the low-pressure side refrigerant drawn into the compressor 21) of the refrigerant circuit 20.

The inside air temperature, the outside air temperature, the coolant temperature, the refrigerant temperature, and the refrigerant pressure may be estimated on the basis of the detection values of various physical quantities.

For example, the temperature TW1 of the coolant in the first coolant circuit C1 may be calculated on the basis of at least one of an outlet port refrigerant pressure of the coolant cooler 14, an inlet refrigerant pressure of the compressor 21, a low-pressure side refrigerant pressure of the refrigerant circuit 20, a low-pressure side refrigerant temperature of the refrigerant circuit 20, and heating operation running time and the like.

For example, the temperature TW2 of the coolant in the second coolant circuit C2 may be calculated on the basis of at least one of an outlet port refrigerant pressure of the coolant heater 15, an discharged refrigerant pressure of the compressor 21, a high-pressure side refrigerant pressure of the refrigerant circuit 20, and a high-pressure side refrigerant temperature of the refrigerant circuit 20.

An operation signal is input to an input side of the controller 50 from an operation panel 58. The operation panel 58 is disposed in the vicinity of a dashboard panel of the vehicle interior, and various operation switches are provided on the operation panel 58. An air conditioning operation switch that is used to perform air conditioning in the vehicle interior, a vehicle interior temperature setting switch that is used to set the temperature of air present in the vehicle interior, a switch that switches ON and OFF of the air conditioner (in other words, ON and OFF of a cooler) and the like are provided as the various operation switches that are provided on the operation panel 58.

Next, the operation of the above-mentioned configuration will be described. When the vehicular heat management system 10 is activated, the controller 50 controls the operation of the first on/off valve 45 and the second on/off valve 46 so as to achieve the non-communicating mode illustrated in FIG. 1, and activates the first pump 11, the second pump 12, and the compressor 21. Accordingly, the coolant circulates in the refrigerant circuit 20, and the coolant circulates in the first coolant circuit C1 and the second coolant circuit C2. In the non-communicating mode, the first coolant circuit C1 and the second coolant circuit C2 are independent from each other.

Since the refrigerant in the refrigerant circuit 20 absorb heat from coolant in the first coolant circuit C1 in the coolant cooler 14, the coolant in the first coolant circuit C1 is cooled. The coolant in the refrigerant circuit 20 absorbed heat from the coolant in the first coolant circuit C1 in the coolant cooler 14 discharges heat to the coolant in the second coolant circuit C2 in the coolant heater 15. Accordingly, the coolant in the second coolant circuit C2 is heated.

The coolant in the second coolant circuit C2 heated by the coolant heater 15 discharges heat to the blast air blown by the interior blower 18 in the heater core 16. Therefore, the blast air blown to the vehicle interior is heated.

The coolant in the first coolant circuit C1 cooled by the coolant cooler 14 absorbs heat from the outside air blown by the exterior blower 17 in the radiator 13. Therefore, a heat pump operation that pumps the heat of the outside air can be realized.

Figure 4:
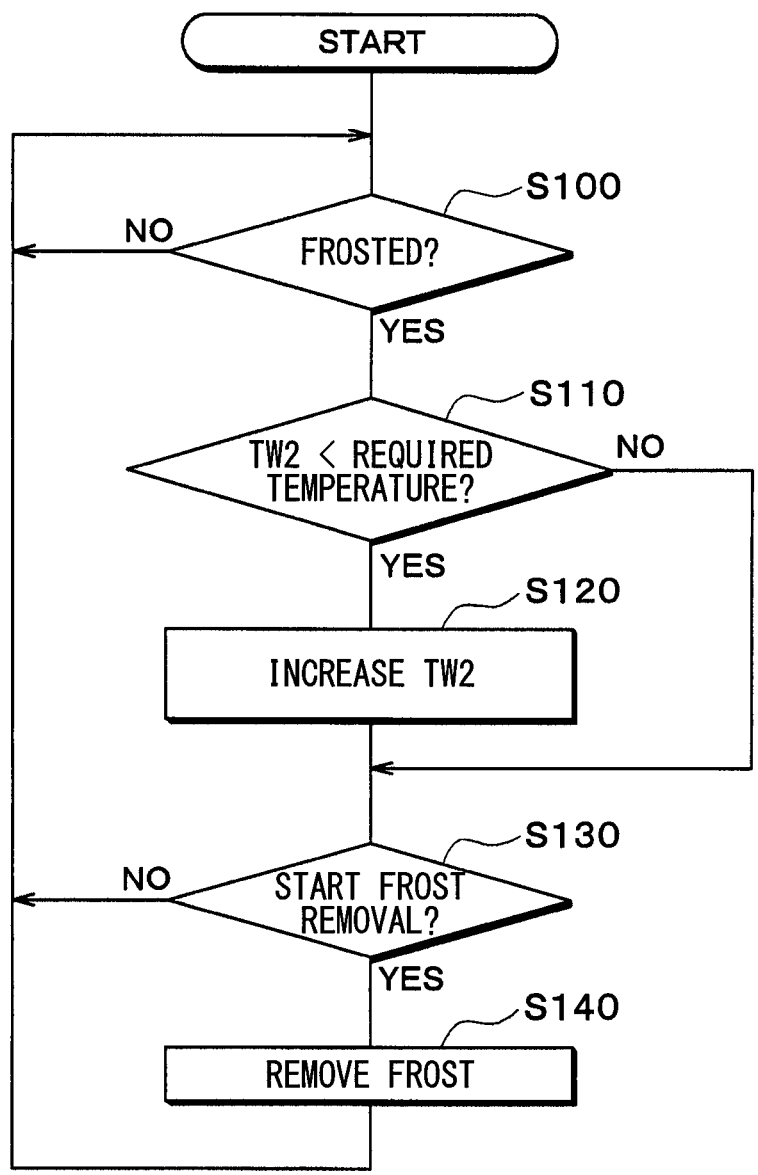
FIG. 4 is a flowchart illustrating a control process of the vehicular heat management system according to the first embodiment.

In this manner, in a state in which the vehicular heat management system 10 is switched to the non-communicating mode, the controller 50 performs a control process illustrated in the flowchart in FIG. 4.

Whether or not frost is adhered to the radiator 13 is determined at Step S100. Determination whether or not frost is adhered to the radiator 13 (hereinafter, referred to as frost formation determination) is performed on the basis of at least one of a traveling speed of the vehicle, the temperature TW1 of the coolant in the first coolant circuit C1, the pressure of the low-pressure side refrigerant of the refrigerant circuit 20, dissociation time between a target blowout temperature TAO of a vehicle interior blast air and an actual blowout temperature TAV of the vehicle interior blast air, the temperature TW2 of the coolant in the second coolant circuit C2, and an ON/OFF state of the ignition switch of the vehicle and the like.

The target blowout temperature TAO of the vehicle interior blast air is calculated, for example, by using a following expression.

$$TAO = Kset \times Tset - Kr \times Tr - Kam \times Tam - Ks \times As + C$$

Meanwhile, Tset denotes a preset temperature in the vehicle interior that is set by the vehicle interior temperature setting switch, Tr denotes the temperature in the vehicle interior (inside air temperature) that is detected by the inside air sensor, Tam denotes the outside air temperature that is detected by the outside air sensor, and As denotes an amount of insolation that is detected by the insolation sensor. Kset, Kr, Kam, Ks denote control gains, and C denotes a constant for correction.

The actual blowing temperature TAV of the vehicle interior blast air is calculated, for example, from the temperature of air blown out from the heater core 16, an opening degree of the air mix door 32, or the like. A temperature sensor that detects the actual blowing temperature TAV of the vehicle interior blast air may be provided.

When it is determined that the frost is not adhered to the radiator 13 at Step S100, the procedure goes back to Step S100, and when it is determined that the frost is adhered to the radiator 13, the procedure goes to Step S110, and whether or not the temperature TW2 of the coolant in the second coolant circuit C2 (warm water temperature) is lower than the required coolant temperature (required temperature) is determined. The required coolant temperature corresponds to the temperature (required heat medium temperature) of the coolant required for removing the frost (frost removal) on the radiator 13.

The required coolant temperature is calculated on the basis of at least one of the temperature TW1 of the coolant in the first coolant circuit C1, an outlet port refrigerant pressure of the coolant cooler 14, an inlet refrigerant pressure of the compressor 21, a low-pressure side refrigerant temperature of the refrigerant circuit 20, and heating operation time.

When it is determined at Step S110 that the temperature TW2 of the coolant in the second coolant circuit C2 is lower than the required coolant temperature, the procedure goes to Step S120, and the temperature TW2 (high temperature) of the coolant in the second coolant circuit C2 increases. Specifically, the temperature TW2 of the coolant in the second coolant circuit C2 is increased by increasing a refrigerant discharging capacity Nc (the number of rotations) of the compressor 21.

The temperature TW2 of the coolant in the second coolant circuit C2 may be increased by decreasing the flow rate of the blast air that passes through the heater core 16. For example, the flow rate of the blast air that passes through the heater core 16 may be decreased by lowering a blowing capacity (the number of rotations of a fan) of the interior blower 18.

The flow rate of the blast air that passes through the heater core 16 may be decreased by adjusting the opening degree of the air mix door 32. In this case, the flow rate of air that flows to bypass the heater core 16 increases and the entire flow rate of the vehicle interior blown out air may be maintained. Therefore, the feeling of air-conditioning may be maintained as much as possible and misting of windows is minimized.

The temperature TW2 of the coolant in the second coolant circuit C2 may be increased by decreasing the flow rate of the coolant that flows through the heater core 16. In this case, the flow rate of the coolant that flows through the heater core 16 may be reduced without reducing the flow rate of the coolant that flows through the coolant heater 15 by operating the three-way valve 41 so that the ratio of the coolant that flows through the bypass channel 40 is increased.

At Step S120, it is preferable to increase the temperature TW2 of the coolant in the second coolant circuit C2 with an increase of the temperature difference obtained by subtracting the temperature TW1 of the coolant in the first coolant circuit C1 from the required coolant temperature. At Step S120, the temperature TW2 of the coolant in the second coolant circuit C2 can be increased with a decrease of the temperature TW1 of the coolant in the first coolant circuit C1.

At Step S130, whether or not the frost removal is to be started (hereinafter, referred to as a determination of start of frost removal) is determined. For example, when the temperature TW2 of the coolant in the second coolant circuit C2 becomes higher than the required coolant temperature, it is determined that the frost removal is to be started, and when the temperature TW2 of the coolant in the second coolant circuit C2 becomes not higher than the required coolant temperature, the start of frost removal is not determined.

When the start of frost removal is not determined, the procedure goes back to Step S100, and when the start of frost removal is determined, the procedure goes to Step S140 and the frost removal is started. In other words, the mode is switched from the non-communicating mode to the communicating mode.

Accordingly, the coolant in the second coolant circuit C2 heated to the required coolant temperature or hither by the coolant heater 15 is introduced into the first coolant circuit C1 and flows through the radiator 13, and hence frost on the radiator 13 is melted.

When it is determined at Step S100 that the frost is adhered to the radiator 13, the heat amount generated by the electric heater 47 may be increased to a quantity larger than that before the determination.

In the present embodiment, the first communicating flow channel 42 and the second communicating flow channel 43 may be used as an example of an introducing portion that introduces the heat amount of the coolant (first heat medium) heated by the coolant heater 15 into the radiator 13. The controller 50 may be used as an example of a coolant temperature adjusting device (heat-medium temperature adjusting device) that determines whether or not frost is adhered to the radiator 13 and, when it is determined that the frost is adhered to the radiator 13, increases the temperature of the coolant heated by the coolant heater 15 to a level higher than that before the determination.

In this configuration, when it is determined that the frost is adhered to the radiator 13, the heat amount of the coolant heated by the coolant heater 15 can reliably be introduced into the radiator 13. Therefore, the heat amount to be introduced into the radiator 13 for melting the frost adhered to the radiator 13 is reliably secured.

In the present embodiment, the controller 50 increases the temperature of the coolant heated by the coolant heater 15 by controlling at least one of the interior blower 18 and the air mix door 32 so as to reduce the flow rate of air that passes through the heater core 16.

Accordingly, since the heat amount radiation from coolant to air in the heater core 16 may be adjusted, the temperature of the coolant heated by the coolant heater 15 can be adjusted.

Specifically, in the case where the flow rate of air that passes through the heater core 16 is adjusted by the air mix door 32, the flow rate of air that passes through the heater core 16 can be adjusted while the flow rate of the entire blown out air into vehicle interior is maintained. Hence, the feeling of air conditioning may be maintained as much as possible and the misting of the windows may be prevented as much as possible even though the temperature of the coolant heated by the coolant heater 15 is adjusted.

In the present embodiment, the controller 50 increases the temperature of the coolant heated by the coolant heater 15 by controlling the three-way valve 41 so that the ratio of the flow rate of the coolant that flows in the heater core 16 decreases and the ratio of the flow rate of the coolant that flows to bypass the heat core 16 increases.

In this configuration, the temperature of the coolant heated by the coolant heater 15 can be increased by reducing the flow rate of coolant that flows in the heater core 16 while the flow rate of the coolant that flows in the coolant heater 15 is maintained.

In the present embodiment, the controller 50 increases the temperature of the coolant heated by the coolant heater 15 in accordance with a decrease of the temperature of the coolant (second heat medium) cooled by the coolant cooler 14 when it is determined that frost is adhered to the radiator 13.

Accordingly, since the heat amount to be introduced into the radiator 13 may be increased with an increase of probability of adhesion of frost to the radiator 13, the frost adhered to the radiator 13 may reliably be melted.

In the present embodiment, the controller 50 determines whether or not the frost is adhered to the radiator 13 is determined on the basis of the temperature TW1 of the coolant detected by a first water temperature sensor 54. Accordingly, whether or not frost is adhered to the radiator 13 can be determined adequately.

In the present embodiment, the controller 50 calculates the required coolant temperature, which is a temperature of the coolant required for melting the frost adhered to the radiator 13 on the basis of the temperature TW1 of coolant detected by the first water temperature sensor 54, and bring the temperature of the coolant heated by the coolant heater 15 closer to the required coolant temperature when it is determined that frost is adhered to the radiator 13. Accordingly, the frost adhered to the radiator 13 is reliably melted.

In the present embodiment, the controller 50 may be configured to determine whether or not frost is adhered to the radiator 13 on the basis of a pressure of a refrigerant detected by the refrigerant pressure sensor 57.

The controller 50 may be configured to calculate the required coolant temperature on the basis of the pressure of the refrigerant detected by the refrigerant pressure sensor 57 and bring the temperature of the coolant heated by the coolant heater 15 closer to the required coolant temperature when the determination is made that the frost is adhered to the radiator 13.

In the present embodiment, the controller 50 may be configured to determine whether or not frost is adhered to the radiator 13 on the basis of the temperature of the low-pressure side refrigerant detected by the refrigerant temperature sensor 56.

The controller 50 may be configured to calculate the required coolant temperature on the basis of the temperature of the low-pressure side refrigerant detected by the refrigerant temperature sensor 56 and bring the temperature of the coolant heated by the coolant heater 15 closer to the required coolant temperature when determining that the frost is adhered to the radiator 13.

In the present embodiment, when it is determined that frost is adhered to the radiator 13, the controller 50 may be configured to let the electric heater 47 increase the heat amount supplied to the coolant to a heat amount that is high relatively compared with a heat amount supplied before a time point of the determination of adhesion of the frost to the radiator 13.

Accordingly, the heat amount to be introduced into the radiator 13 for melting frost adhered to the radiator 13 is further reliably secured.

(Second Embodiment)

Figure 5:
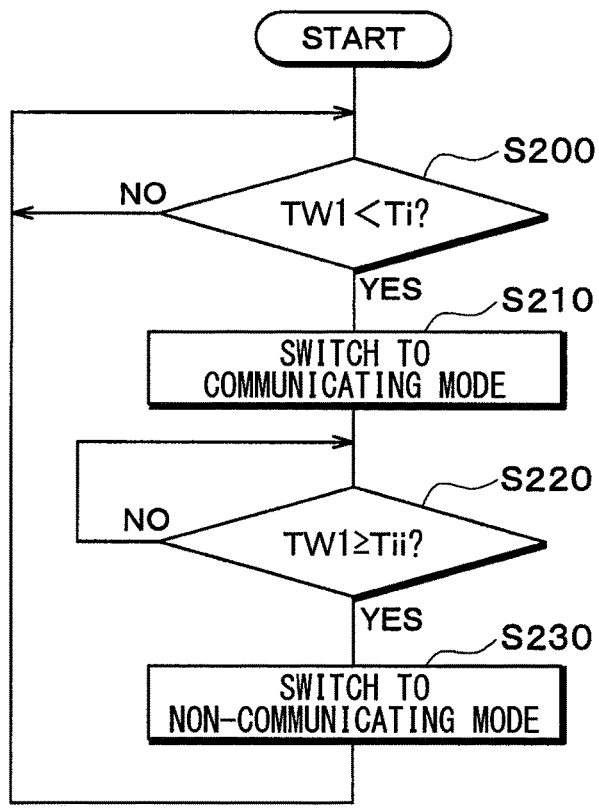
FIG. 5 is a flowchart illustrating a control process of a vehicular heat management system according to a second embodiment of the present disclosure.

In a second embodiment of the present disclosure, points different from the above-mentioned first embodiments will be described. The second embodiment is different from the first embodiment in a control process performed by a controller 50. In a state in which a vehicular heat management system 10 is switched to the non-communicating mode, the controller 50 performs a control process illustrated in the flowchart in FIG. 5.

At step S200, whether or not the temperature TW1 of coolant that flows in a first coolant circuit C1 is lowered to a level lower than a first predetermined temperature Ti is detected. The first predetermined temperature Ti is a value memorized in the controller 50 in advance.

When the temperature TW1 of coolant that flows in the first coolant circuit C1 is determined not to be lower than the first predetermined temperature Ti at Step S200, Step S200 is repeated. Therefore, the non-communicating mode is maintained.

When the temperature TW1 of coolant that flows in the first coolant circuit C1 is determined to be lower than the first predetermined temperature Ti at Step S200, the procedure goes to Step S210, the mode is switched to the communicating mode, and the procedure goes to Step S220. In the communicating mode, a first pump 11 and a second pump 12 are stopped, and a third pump 44 is operated.

Accordingly, the first coolant circuit C1 and a second coolant circuit C2 are coupled, and the high-temperature coolant in the second coolant circuit C2 flows into the first coolant circuit C1, so that the temperature TW1 of the coolant that flows in the first coolant circuit C1 increases.

Figure 6:
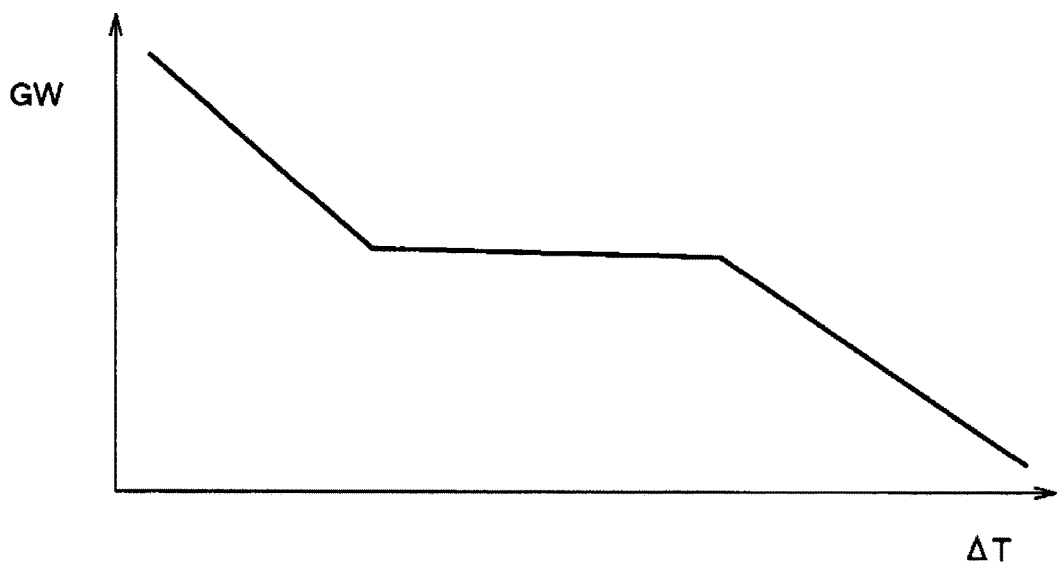
FIG. 6 is a control characteristic diagram used in the control process of the vehicular heat management system according to the second embodiment.

At this time, the controller 50 controls a flow rate GW of coolant that flows from the second coolant circuit C2 to the first coolant circuit C1 on the basis of a control map illustrated in FIG. 6.

In other words, a set value of the flow rate GW of coolant that flows from the second coolant circuit C2 to the first coolant circuit C1 is decreased with an increase of a temperature difference $\Delta T = TW2 - TW1$, which is obtained by subtracting the temperature TW1 of the coolant that flows in the first coolant circuit C1 from the temperature TW2 of coolant flowing in the second coolant circuit C2.

Accordingly, such an event that a heat amount load is applied suddenly to the first coolant circuit C1 when the mode is switched from the non-communicating mode to the communicating mode which causes an occurrence of thermal distortion in components of the first coolant circuit C1 is restricted.

Control of the coolant flow rate GW may be achieved, for example, by control of the number of rotations of the third pump 44 (coolant discharging capacity) or control of opening degrees of a first on/off valve 45 and a second on/off valve 46. A third coolant flow rate control unit 50*h*, an on/off valve control unit 50*i*, the third pump 44, the first on/off valve 45, and the second on/off valve 46 may be used as an example of an inter-circuit flow rate control device that reduces the flow rate GW of coolant that flows from the second coolant circuit C2 to the first coolant circuit C1.

The first pump 11 and the second pump 12 do not necessarily have to be stopped at Step S210.

At step S220, whether or not the temperature TW1 of coolant that flows in the first coolant circuit C1 is not lower than a second predetermined temperature Tii is detected. The second predetermined temperature Tii is a value memorized in the controller 50 in advance, and is a value larger than the first predetermined temperature Ti.

When the temperature TW1 of coolant that flows in the first coolant circuit C1 is determined to be lower than the second predetermined temperature Tii at Step S220, Step S220 is repeated. Therefore, the communicating mode is maintained.

When the temperature TW1 of coolant that flows in the first coolant circuit C1 is determined not to be lower than the second predetermined temperature Tii at Step S220, the procedure goes to Step S230 and the vehicular heat management system 10 is switched to the non-communicating mode. Accordingly, the first coolant circuit C1 and the second coolant circuit C2 are decoupled, and the high-temperature coolant in the second coolant circuit C2 does not flow into the first coolant circuit C1, so that the temperature TW1 of the coolant that flows in the first coolant circuit C1 decreases.

In this manner, by switching the mode between the non-communicating mode and the communicating mode in accordance with the temperature TW1 of the coolant that flows in the first coolant circuit C1, the temperature TW1 of the coolant that flows in the first coolant circuit C1 may be maintained in a range between the first predetermined temperature Ti and the second predetermined temperature Tii.

Figure 7:
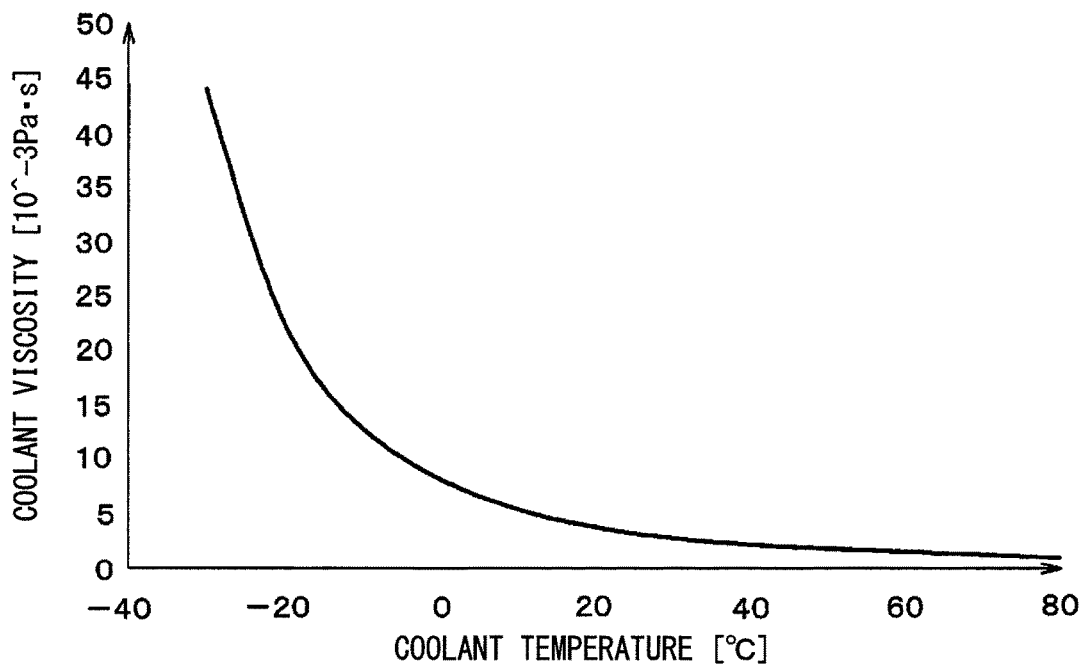
FIG. 7 is a diagram illustrating a relationship between a temperature of a coolant and a viscosity of the coolant.

An event which may occur by a decrease of the temperature of the coolant more than necessary will now be described. FIG. 7 is a graph illustrating a relationship between the temperature of the coolant and the viscosity of coolant in the case where the coolant is an ethylene glycol-based antifreezing fluid (LLC). As illustrated in FIG. 7, the viscosity of coolant increases significantly when the temperature of the coolant decreases. When the viscosity of the coolant increases, a pressure loss of the coolant increases which leads to a decrease of the flow rate of the coolant. At this time, when an attempt is made to maintain the flow rate of the coolant, an increase in power for circulating the coolant might result.

In the case where the flow rate of the coolant decreases, a coolant cooler 14 performs the following behavior. It is considered that in order to maintain a heat exchange capability in the coolant cooler 14, the temperature difference between an inlet coolant temperature Tin and an outlet coolant temperature Tout of the coolant cooler 14 increases to achieve a balance with the decrease of the flow rate of the coolant. In other words, it is considered that the outlet coolant temperature Tout of the coolant cooler 14 is lowered. It is clear from the following expression.

$$Q = cpw \times Gw \times (Tin - Tout)$$

where Q is a heat exchange capability, cpw is a specific heat of coolant, and GW is a mass flow rate of the coolant.

When the outlet coolant temperature Tout of the coolant cooler 14 decreases, a further decrease of the temperature of the coolant may result.

When the temperature of the coolant that flows in a radiator 13 reaches a temperature below zero degree, water content in the outside air coagulates in the radiator 13 and frost formation (frost) develops. According to the perception found by the inventors through experiments, it was found that as the frost formation develops in the radiator 13, further lowering of the temperature of the coolant may result.

When the further lowering of the temperature of the coolant occurs, the temperature of the coolant may be lowered to a level below a freezing point, so that the coolant may be coagulated. In particular, when the coolant pump is stopped, no pressure is applied to coolant, and hence the coolant tends to coagulate. Therefore, such an event that the coolant does not flow when the coolant pump is restarted may occur.

Figure 8:
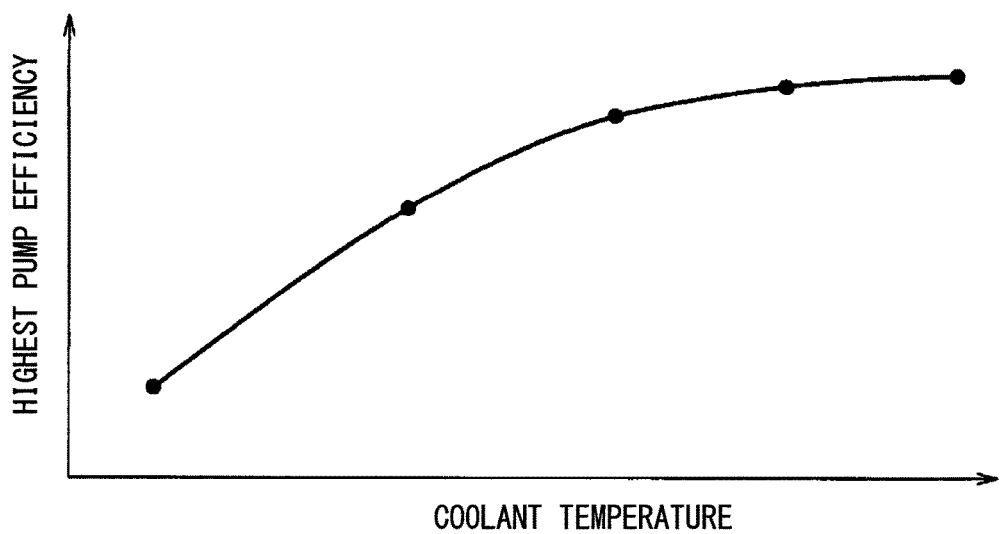
FIG. 8 is a diagram illustrating a relationship between the temperature of a coolant and the highest efficiency of a coolant pump.

As illustrated in FIG. 7, FIG. 8, the temperature of the coolant decreases, the viscosity of the coolant increases, and hence deterioration of efficiency of the coolant pump may result.

In particular, in the case where the coolant is an ethylene glycol-based antifreezing fluid (LLC), the coolant temperature decreases easily to −20° C. or lower due to the influence of frost formation, and in this temperature range, the viscosity of the coolant obviously increases as is apparent from FIG. 7. Consequently, the above-mentioned event may be obvious.

According to the present embodiment, since the temperature TW1 of the coolant that flows in the first coolant circuit C1 may be maintained at the first predetermined temperature Ti or higher, the temperature of the coolant may be prevented from decreasing more than necessary. Therefore, an occurrence of the above-mentioned event is restricted.

In the present embodiment, the first, second on/off valves 45, 46, and the controller 50 (switching device 50i) switches the mode to the communicating mode in which the first coolant circuit C1 and the second coolant circuit C2 are coupled in the case where the temperature TW1 of the coolant that flows in the first coolant circuit C1 is not higher than the predetermined temperature Ti, and switches the mode to the non-communicating mode in which the first coolant circuit C1 and the second coolant circuit C2 are not coupled in the case where the temperature TW1 of the coolant that flows in the first coolant circuit C1 is not lower than the predetermined temperature Ti.

In this configuration, in the case where the temperature TW1 of the coolant that flows in the first coolant circuit C1 is not higher than the predetermined temperature Ti, the temperature TW1 of the coolant that flows in the first coolant circuit C1 may be increased by causing the coolant in the second coolant circuit C2 (coolant heated by the coolant heater 15) to flow into the first coolant circuit C1.

Therefore, since the temperature TW1 of the coolant that flows in the first coolant circuit C1 may be maintained at the predetermined temperature Ti or higher, the temperature of the coolant may be restricted from decreasing more than necessary.

In the present embodiment, in the case of the communicating mode, coolant flows from the second coolant circuit C2 to the coolant cooler 14. In this configuration, since the temperature of the coolant that flows in the coolant cooler 14 can be increased, an increase of the viscosity of the coolant cooled by the coolant cooler 14 and coagulation of coolant in the coolant cooler 14 are restricted.

In the present embodiment, in the communicating mode, coolant flows from the second coolant circuit C2 to the radiator 13. In this configuration, since the temperature of the coolant that flows in the radiator 13 may be increased, such an event that the viscosity of the coolant that flows in the radiator 13 increases and a pressure loss of the coolant in the first coolant circuit C1 is increased is restricted.

In the present embodiment, in the case of the communicating mode, coolant that flows from a coolant heater 15 to the first coolant circuit C1. Accordingly, since the coolant at a high temperature heated by the coolant heater 15 flows in the first coolant circuit C1, the temperature of the coolant that flows in the first coolant circuit C1 may be effectively increased.

In the present embodiment, in the case of the communicating mode, coolant flows from a heater core 16 to the first coolant circuit C1. Accordingly, since the coolant at a high temperature in the second coolant circuit C2 flows in the first coolant circuit C1, the temperature of the coolant flowing in the first coolant circuit C1 may be increased.

In the present embodiment, a set value of the flow rate of coolant that flows from the second coolant circuit C2 to the first coolant circuit C1 is decreased with an increase of a temperature difference ΔT, which is obtained by subtracting the temperature TW1 of the coolant that flows in the first coolant circuit C1 from the temperature TW2 of coolant that flows in the second coolant circuit C2.

Accordingly, such an event that a heat amount load is applied suddenly to the first coolant circuit C1 which causes an occurrence of thermal distortion in components of the first coolant circuit C1 is restricted.

In the case where the coolant is an ethylene glycol-based antifreezing fluid, the above-mentioned advantageous effects become obvious.

(Third Embodiment)

Figure 9:
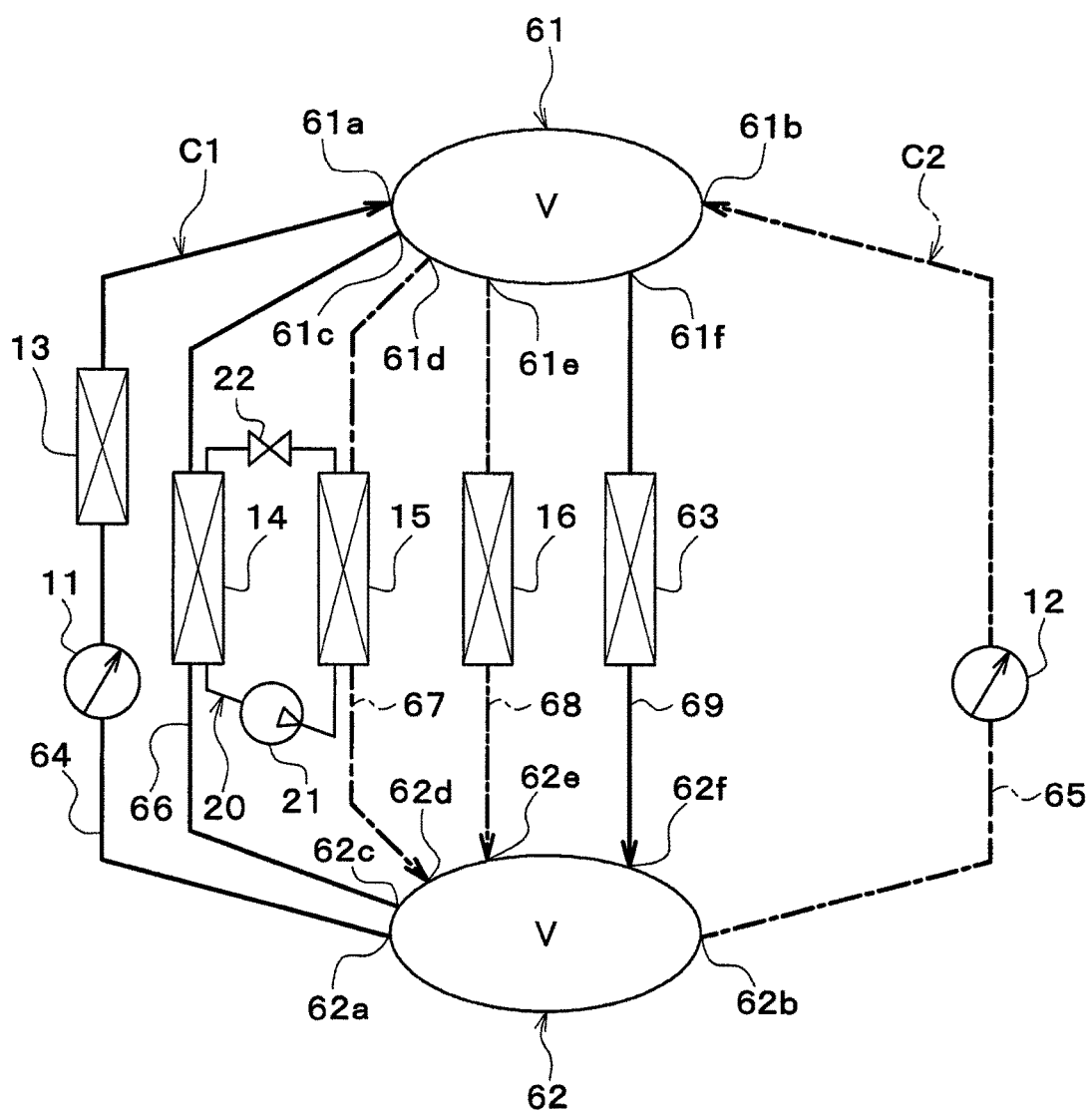
FIG. 9 is a schematic diagram of a vehicular heat management system according to a third embodiment of the present disclosure.

In the above-mentioned embodiments, the mode was switched between the communicating mode and the non-communicating mode by the first, second on/off valves 45, 46. However, in the present embodiment, the mode is switched between the communicating mode and the non-communicating mode by a first switching valve 61 and a second switching valve 62 as illustrated in FIG. 9.

In the present embodiment, a vehicular heat management system 10 includes a heat generating device 63. The heat generating device 63 is a heat generating apparatus that generates heat in association with an operation. The heat generating device 63 is an apparatus including a flow channel in which coolant flows, in which the heat is received by the coolant (temperature adjustment-target device).

Examples of the heat generating device 63 include an inverter, a battery, a traveling electric motor, an engine, and a fuel cell. The inverter is a power conversion device that converts a DC power, which is supplied from the battery, into an AC voltage and outputs the AC voltage to the traveling electric motor.

The first switching valve 61 and the second switching valve 62 may be used as an example of the above-mentioned switching device (heat medium flow switching device) that switches a flow of the coolant. In the present embodiment, the first switching valve 61 and the second switching valve 62 may be used as an example of the above-mentioned introducing portion that introduces the heat amount of the coolant (first heat medium) heated by a coolant heater 15 into a radiator 13.

The first switching valve 61 is a multiple-port valve having a number of ports (first switching valve ports) which constitute inlet and outlet of coolant. Specifically, the first switching valve 61 includes a first inlet 61a and a second inlet 61b as inlets of coolant, and first to fourth outlets 61c to 61f as outlets of the coolant.

The second switching valve 62 is a multiple-port valve having a number of ports (second switching valve ports) which constitute inlet and outlet of the coolant. Specifically, the second switching valve 62 includes a first outlet 62a and a second outlet 62b as outlets of coolant, and first to fourth inlets 62c to 62f as inlets of the coolant.

An end of a first flow channel 64 is connected to the first inlet 61a of the first switching valve 61. The other end of the first flow channel 64 is connected to the first outlet 62a of the second switching valve 62. A first pump 11 and the radiator 13 are disposed in the first flow channel 64.

An end of a second flow channel 65 is connected to the second inlet 61b of the first switching valve 61. The other end of the second flow channel 65 is connected to the second outlet 62b of the second switching valve 62. A second pump 12 is disposed in the second flow channel 65.

An end of a third flow channel 66 is connected to the first outlet 61c of the first switching valve 61. The other end of the third flow channel 66 is connected to the first inlet 62c of the second switching valve 62. A coolant cooler 14 is disposed in the third flow channel 66.

An end of a fourth flow channel 67 is connected to the second outlet 61d of the first switching valve 61. The other end of the fourth flow channel 67 is connected to the second inlet 62d of the second switching valve 62. The coolant heater 15 is disposed in the fourth flow channel 67.

An end of a fifth flow channel 68 is connected to the third outlet port 61e of the first switching valve 61. The other end of the fifth flow channel 68 is connected to the third inlet 62e of the second switching valve 62. A heater core 16 is disposed in the fifth flow channel 68.

An end of a sixth flow channel 69 is connected to the fourth outlet 61f of the first switching valve 61. The other end of the sixth flow channel 69 is connected to the fourth inlet 62f of the second switching valve 62. The heat generating device 63 is disposed in the sixth flow channel 69.

The first switching valve 61 is structured so as to arbitrarily or selectively switch a communication state between the respective inlets 61a, 61b and the respective outlets 61c to 61f. The second switching valve 62 is also structured so as to arbitrarily or selectively switch a communication state between the respective outlets 62a, 62b and the respective inlets 62c to 62f.

Specifically, the first switching valve 61 switches each of the coolant cooler 14, the coolant heater 15, the heater core 16, and the heat generating device 63 separately to a state in which the coolant discharged from the first pump 11 flows therein, a state in which the coolant discharged from the second pump 12 flows therein, or a state in which the coolant discharged from the first pump 11 and the coolant discharged from the second pump 12 do not flow therein.

The second switching valve 62 switches each of the coolant cooler 14, the coolant heater 15, the heater core 16, and the heat generating device 63 separately to a state in which the coolant flows into the first pump 11, a state in which the coolant flows into the second pump 12, or a state in which the coolant does not flow into the first pump 11 and the second pump 12.

A structural example of the first switching valve 61 and the second switching valve 62 will be described in brief. Each of the first switching valve 61 and the second switching valve 62 includes a case forming an outer shell, and a valve body housed in the case. The inlets and the outlets of the coolant are defined at predetermined positions of the case, and the valve body is rotationally operated to change the communication state between the inlets and the outlets of the coolant.

The valve body of the first switching valve 61 and the valve body of the second switching valve 62 are rotationally driven by separate electric motors, individually. Operations of the electric motor for the first switching valve 61 and the electric motor for the second switching valve 62 are controlled by a controller 50. The valve body of the first switching valve 61 and the valve body of the second switching valve 62 may be rotationally driven by a common electric motor in conjunction with each other.

The controller 50 controls the operation of the electric motor for the first switching valve 61 and the electric motor for the second switching valve 62 to switch one of various operating modes to another.

For example, in the non-communicating mode, the first flow channel 64 and at least one of the third to the sixth flow channels 66 to 69 constitute a first coolant circuit C1 (first heat medium circuit), and the second flow channel 65 and at least one of the third to the sixth flow channels 66 to 69 constitute a second coolant circuit C2 (second heat medium circuit).

The coolant cooler 14, the coolant heater 15, the heater core 16, and the heat generating device 63 may be adjusted to an adequate temperature by switching each of the third to the sixth flow channels 66 to 69 to the case of being connected to the first coolant circuit C1 and the case of being connected to the second coolant circuit C2 according to the circumstances.

As illustrated in FIG. 9, in the case where the coolant cooler 14 and the radiator 13 are connected to the first coolant circuit C1, and the coolant heater 15 and the heater core 16 are connected to the second coolant circuit C2, the vehicle interior can be heated by a heat pump operation of a refrigerant circuit 20.

In other words, in the first coolant circuit C1, since the coolant cooled by the coolant cooler 14 flows in the radiator 13, the coolant absorbs heat from the outside air in the radiator 13. The coolant that absorbs heat from the outside air in the radiator 13 exchanges heat with the refrigerant of the refrigerant circuit 20 in the coolant cooler 14 to radiate heat. Therefore, in the coolant cooler 14, the refrigerant of the refrigerant circuit 20 absorbs heat from the outside air through the coolant.

The refrigerant that absorbs heat from the outside air in the coolant cooler 14 radiates heat by heat exchanging with the coolant in the second coolant circuit C2 in the coolant heater 15. Therefore, the coolant is heated by the coolant heater 15. The coolant heated by the coolant heater 15 radiates heat by heat exchange with the blast air blown into the vehicle interior by the heater core 16. Therefore, the blast air blown into the vehicle interior is heated by the heater core 16.

Therefore, a heat pump operation that pumps heat of the outside air and heats the blast air blown into the vehicle interior can be realized.

In the communicating mode, the first switching valve 61 and the second switching valve 62 are coupled to the first coolant circuit C1 and the second coolant circuit C2. Accordingly, since coolant at a high temperature in the second coolant circuit C2 flows into the first coolant circuit C1, the temperature TW1 of the coolant that flows in the first coolant circuit C1 may be increased.

In other words, in the non-communicating mode, the first switching valve 61 switches the flow of the coolant so as not to allow the coolant to flow from the second coolant circuit C2 to the first coolant circuit C1, and the second switching valve 62 switches the flow of the coolant so as not to allow the coolant to flow from the first coolant circuit C1 to the second coolant circuit C2.

In contrast, in the communicating mode, the first switching valve 61 switches the flow of the coolant so as to allow the coolant to flow from the second coolant circuit C2 to the first coolant circuit C1, and the second switching valve 62 switches the flow of the coolant so as to allow the coolant to flow from the first coolant circuit C1 to the second coolant circuit C2.

Accordingly, the mode can be switched between the communicating mode and the non-communicating mode by the first switching valve 61 and the second switching valve 62.

In the operating mode illustrated in FIG. 9, the heat generating device 63 is connected to the first coolant circuit C1. In this configuration, the coolant circulating in the first coolant circuit C1 is heated by waste heat of the heat generating device 63. Therefore, the temperature of the coolant that circulates in the first coolant circuit C1 is restricted from decreasing more than necessary, and the heat generating device 63 can be cooled by the coolant that circulates in the first coolant circuit C1.

(Fourth Embodiment)

Figure 10:
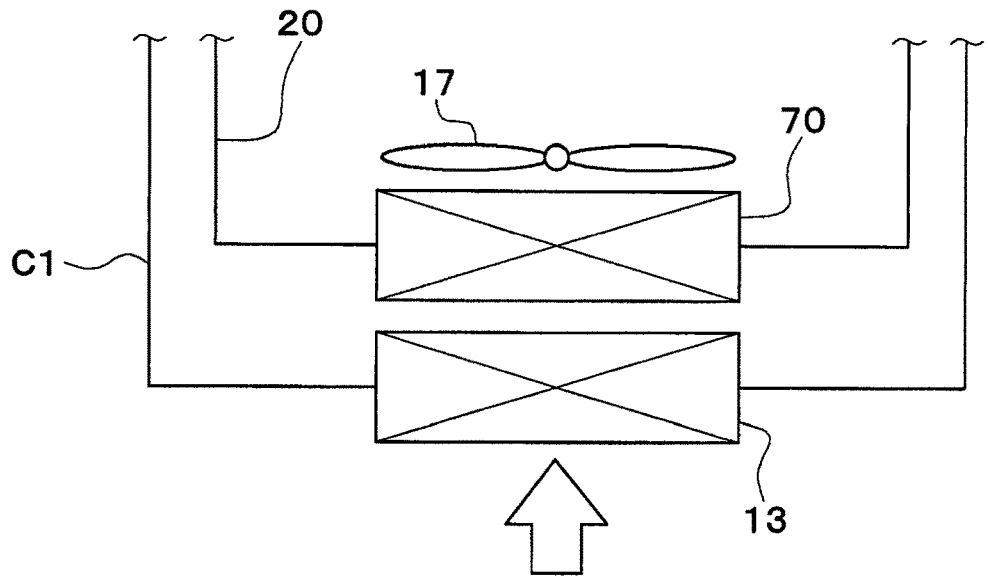
FIG. 10 is a schematic diagram illustrating a part of a vehicular heat management system according to a fourth embodiment of the present disclosure.

In the present embodiment, an exterior condenser 70 is disposed on a downstream side in the direction of the outside air flow of a radiator 13 as illustrated in FIG. 10. The exterior condenser 70 may be used as an example of an air-refrigerant heat exchanger (refrigerant cooler) that cools and coagulates the high-pressure side refrigerant by exchanging heat between the high-pressure side refrigerant of the refrigerant circuit 20 and the outside air. In this configuration, frost can be removed by introducing the heat amount to the radiator 13 on an upstream side in a direction of the outside air flow.

Figure 11:
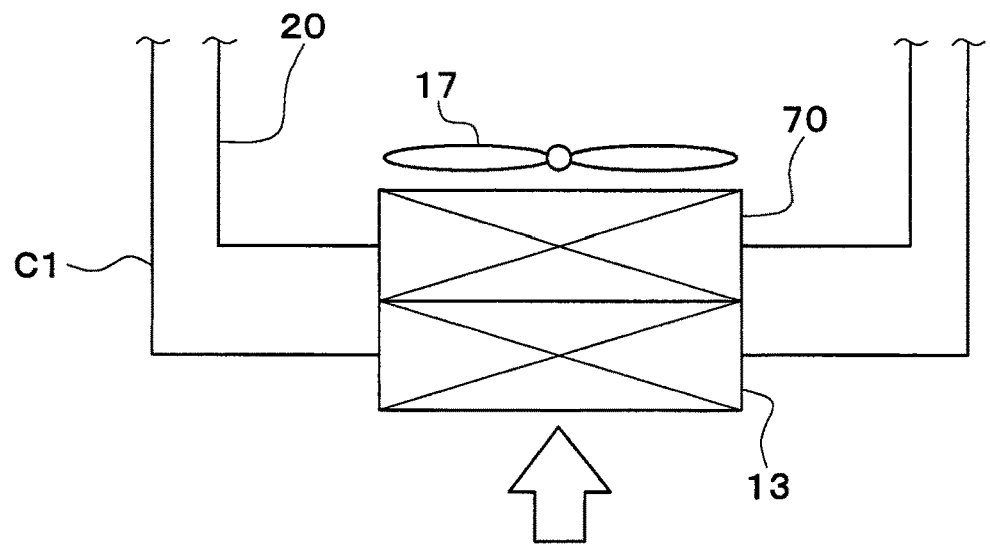
FIG. 11 is a schematic diagram illustrating a part of a vehicular heat management system according to a modification according to the fourth embodiment.

As illustrated in FIG. 11, the exterior condenser 70 and the radiator 13 may be integrated to constitute a single heat exchanger. When the exterior condenser 70 and the radiator 13 are thermally coupled, frost can be melted by transmitting heat that the high-pressure side refrigerant flowing in the exterior condenser 70 has to the radiator 13.

For example, in the case where the exterior condenser 70 and the radiator 13 have a laminated structure of a tube and a fin, the exterior condenser 70 and the radiator 13 can be thermally coupled with the fin. The fin is a member joined to an outer surface side of the tube to expand heat transmitting surface area on an air side. The exterior condenser 70 and the radiator 13 may be thermally coupled by using a member other than the fin.

The above-mentioned embodiments can be appropriately combined together. The above-mentioned embodiments can be variously modified, for example, as follows.

In the above-mentioned embodiments, various types of temperature adjustment-target devices (cooling-target device and heating-target device) which are adjusted in temperature (cooled and heated) by the coolant may be disposed in the first coolant circuit C1 and the second coolant circuit C2.

In addition, a configuration in which the case where the first coolant circuit C1 and the second coolant circuit C2 are connected via the switching valve and the switching valve switches the connection between the case where the coolant to be taken in and discharged out by the first pump 11 circulates in multiple heat medium flowing apparatuses disposed in the first coolant circuit C1 and the second coolant circuit C2 and the case where the coolant to be taken in and discharged out by the second pump 12 circulates therein is also applicable.

Figure 12:
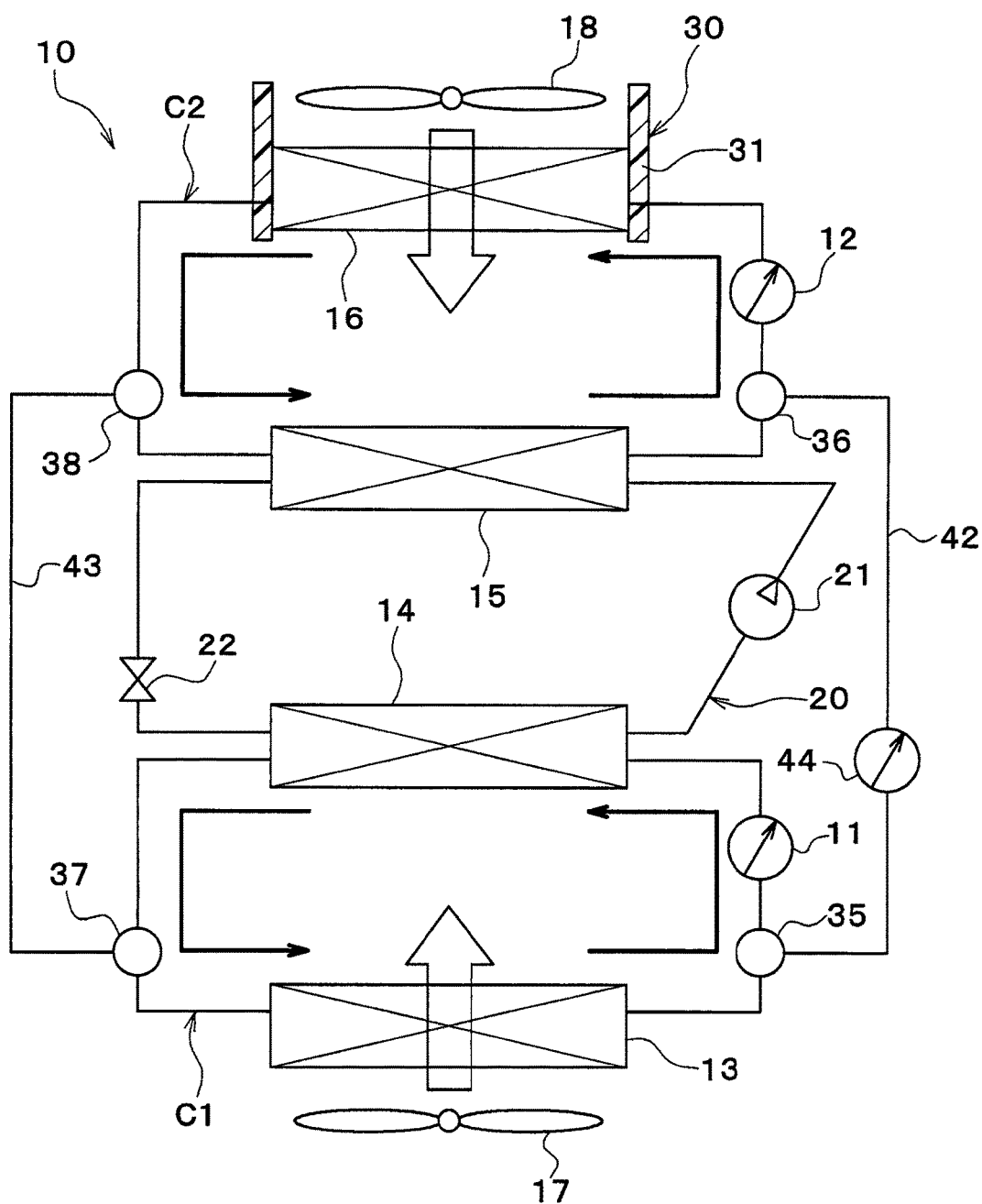
FIG. 12 is a schematic diagram illustrating a non-communicating mode of a vehicular heat management system according to a modification of the present disclosure.
Figure 13:
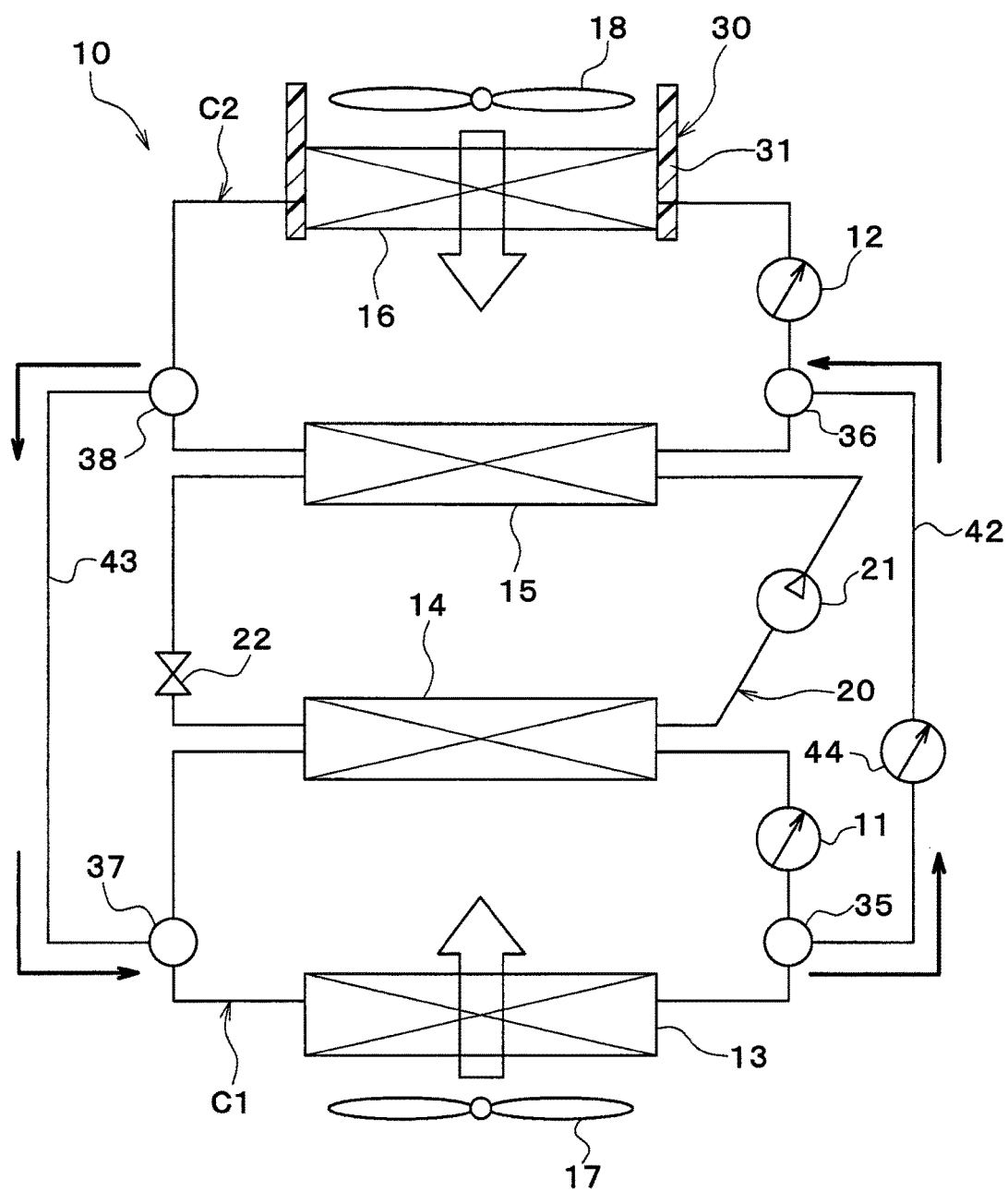
FIG. 13 is a schematic diagram illustrating a communicating mode of the vehicular heat management system according to the modification of the present disclosure.

In the first and the second embodiments mentioned above, four on/off valves 35 to 38 may be disposed instead of the first on/off valve 45 and the second on/off valve 46 as illustrated in FIGS. 12 and 13. Specifically, the first on/off valve 35 may be disposed at a connecting portion between the first communicating flow channel 42 and the first coolant circuit C1. The second on/off valve 36 may be disposed at a connecting portion between the first communicating flow channel 42 and the second coolant circuit C2. The third on/off valve 37 may be disposed at a connecting portion between the second communicating flow channel 43 and the first coolant circuit C1. The fourth on/off valve 38 may be disposed at a connecting portion between second communicating flow channel 43 and the second coolant circuit C2.

The first to fourth on/off valves 35 to 38 are opening/closing devices that open and close the first communicating flow channel 42 and the second communicating flow channel 43, and are composed of, for example, electromagnetic valves. The first to the fourth on/off valves 35 to 38 may be used as an example of the above-mentioned switching device that switches a non-communicating mode illustrated in FIG. 12 and a communicating mode illustrated in FIG. 13. The first to the fourth on/off valves 35 to 38 may be used as an example of the above-mentioned inter-circuit flow rate control device that reduces the flow rate GW of coolant that flows from the second coolant circuit C2 to the first coolant circuit C1.

Four three-way valves may be disposed instead of the four on/off valves 35 to 38. Each three-way valve has three ports (inlet and outlet of the coolant), and two ports out of three ports communicate with each other and a remaining port is closed.

In the case where the four three-way valves are disposed instead of the four on/off valves 35 to 38, in the communicating mode, the coolant circulates from the third pump 44→the coolant heater 15 or the heater core 16→the radiator 13 or the coolant cooler 14→the third pump 44 in this order.

In other words, by disposing the four three-way valves instead of the four on/off valves 35 to 38, in the communicating mode, a configuration in which the coolant does not circulates in one of the coolant heater 15 and the heater core 16 and the coolant does not circulates in one of the radiator 13 and the coolant cooler 14 is achieved.

In the communicating mode, in a configuration in which the coolant heated by the coolant heater 15 does not flow in the first coolant circuit C1, the heat amount of the coolant remains in the coolant heater 15, so that the refrigerant circuit 20 can behave quickly when switched to the non-communicating mode subsequently.

In the first and the second embodiment mentioned above, a configuration in which the coolant flows in the bypass channel 40 but not in the heater core 16 in the communicating mode by using the three-way valve 41 is also applicable.

In this configuration, the coolant heated by the coolant heater 15 may be flowed into the first coolant circuit C1 while the blast air to the vehicle interior is heated by the heat of the coolant remaining in the heater core 16 in the communicating mode. Therefore, the temperature of the coolant in the first coolant circuit C1 may be restricted from decreasing more than necessary without stopping heating in the vehicle interior.

In the above-mentioned second embodiment, the number of the ports of the first switching valve 61, the number of the ports of the second switching valve 62, and the number of the flow channels to be connected to the first and the second switching valves 61, 62 may be increased and decreased as needed.

In the above-mentioned embodiments, a heat accumulator may be provided in the second coolant circuit C2. The heat accumulator is a heat accumulating portion that accumulates heat of the coolant that flows in the second coolant circuit C2. A heat-insulating container that stores, for example, a high temperature coolant or a member or the like having a large heat capacity may be used as the heat accumulator.

A configuration in which the heat accumulator is provided in a coolant circuit separate from the second coolant circuit C2 (hereinafter, referred to as a heat accumulating circuit), and the coupling valve that switches the coupling state to the coupled state in which the heat accumulating circuit and the second coolant circuit C2 are coupled. In this configuration, for example, heat may be accumulated gradually in the heat accumulating circuit by gradually doubling the flow rate of the coolant that flows into the heat accumulating circuit from the second coolant circuit C2 in the coupled state and, when it is determined that heat is sufficiently accumulated in the heat accumulating circuit, the coupling state may be switched to the non-coupled state in which the heat accumulating circuit and the second coolant circuit C2 are not coupled to reduce a pump output.

Although the coolant is used as a heat medium that flows in the heater core 16 in the above-mentioned embodiments, various mediums such as oil may be used as the heat medium.

Nanofluid may be used as the heat medium. The nanofluid is fluid with which nanoparticles having a particle diameter on the order of nanometers are mixed. When nanoparticles are mixed with a heat medium, the following effects can be obtained in addition to the effect of lowering a freezing point like a coolant using ethylene glycol (so-called antifreeze).

That is, an effect of improving thermal conductivity in a specific temperature zone, an effect of increasing the heat capacity of the heat medium, an effect of preventing the corrosion of a metal pipe, an effect of preventing the degradation of a rubber pipe, and an effect of increasing the fluidity of the heat medium at an extremely low temperature can be obtained.

These effects are variously changed according to the structure, the shape, and the mixing ratio of the nanoparticles and additives.

According to this, thermal conductivity can be improved. Accordingly, even though an amount of heat medium less than a coolant using ethylene glycol is used, equivalent cooling efficiency can be obtained.

Further, since the heat capacity of the heat medium can be increased, the cold and heat quantity accumulated in a heat medium (cold and heat stored using sensible heat) of the heat medium per se can be increased.

With an increase in the accumulated cold and heat quantity, even in a state where the compressor 21 does not operate, because the adjustment of cooling and heating of the equipment using cold and heat storage can be implemented for a certain amount of time, the power saving of the vehicular heat management system 10 can be performed.

It is preferable that an aspect ratio of the nanoparticle is 50 or more. The reason is because sufficient thermal conductivity can be obtained. Meanwhile, the aspect ratio is a shape index that shows a ratio of a vertical size of the nanoparticle to a horizontal size thereof.

A nanoparticle, which contains any of Au, Ag, Cu, and C, can be used as the nanoparticle. Specifically, an Au nanoparticle, an Ag nanowire, CNT (carbon nano-tube), graphene, a graphite core-shell type nanoparticle (a particle having a structure, such as a carbon nano-tube, so as to surround the above-mentioned atoms), CNT containing Au nanoparticles, and the like can be used as the constituent atoms of the nanoparticle.

A fluorocarbon refrigerant is used as the refrigerant in the refrigerant circuit 20 of the above-mentioned embodiments. However, the type of the refrigerant is not limited thereto, and a natural refrigerant, such as carbon dioxide, a hydrocarbon-based refrigerant, and the like may be used as the refrigerant.

Further, the refrigerant circuit 20 of the above-mentioned embodiments forms a subcritical refrigeration cycle of which high pressure-side refrigerant pressure does not exceed the critical pressure of the refrigerant, but may form a supercritical refrigeration cycle of which high pressure-side refrigerant pressure exceeds the critical pressure of the refrigerant.

In the above-mentioned embodiments, the example in which the vehicular heat management system 10 is applied to a hybrid vehicle has been described. Alternatively, the vehicular heat management system 10 may be applied to an electric vehicle and the like that is not provided with an engine and obtains a drive force for the traveling of a vehicle from a traveling electric motor.

Figure 2:
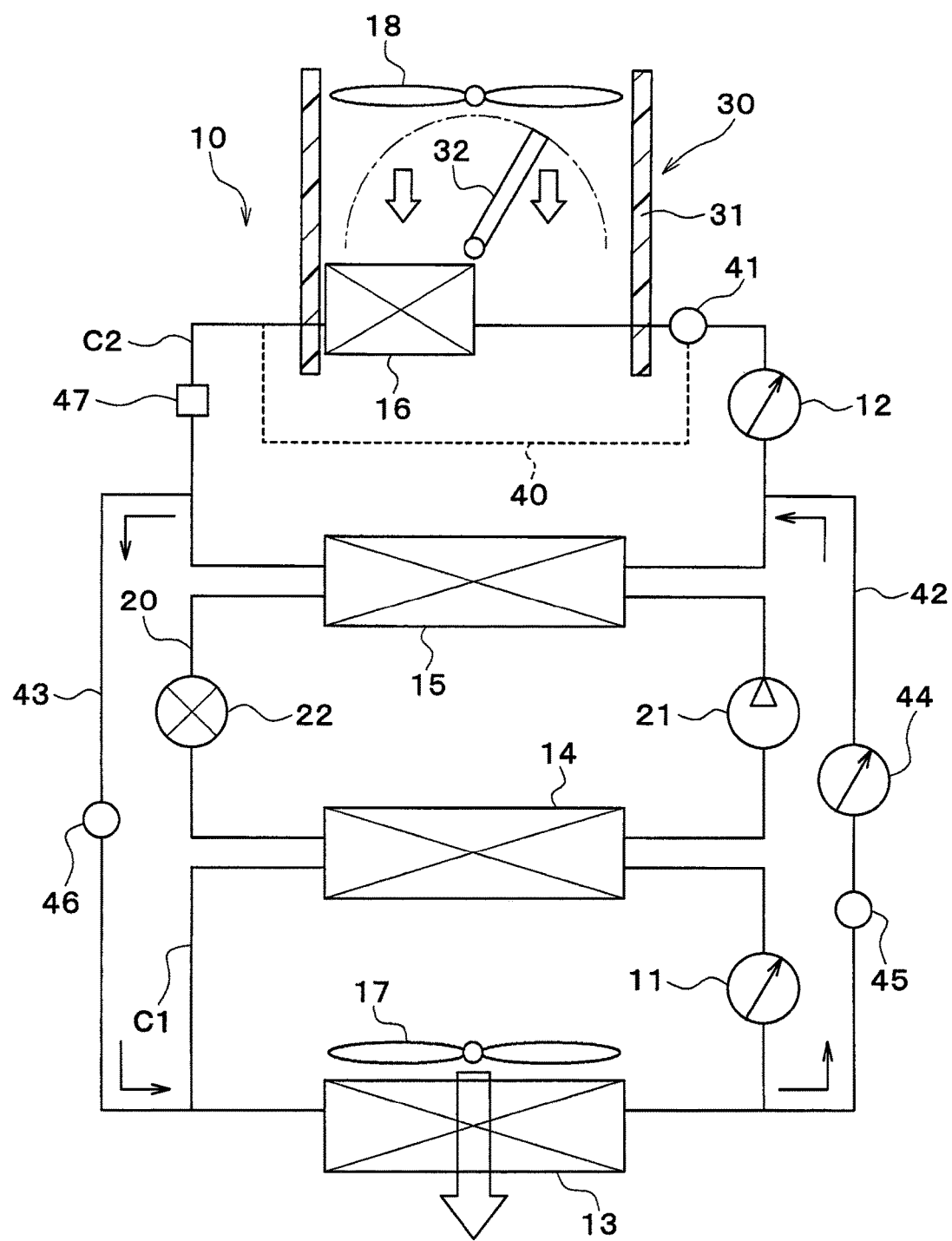
FIG. 2 is a schematic diagram illustrating a communicating mode of the vehicular heat management system according to the first embodiment.

As illustrated in FIG. 12 and FIG. 13, the bypass channel 40, the three-way valve 41, the air mix door 32, and the electric heater 47 illustrated in FIG. 1 and FIG. 2 do not necessarily have to be provided.

The invention claimed is:

1. A vehicular heat management system comprising:
a low-pressure side heat exchanger configured to cool a heat medium by heat exchange between a low-pressure side refrigerant of a refrigeration cycle and the heat medium;
a first heat medium circuit in which the heat medium cooled by the low-pressure side heat exchanger circulates;
a high-pressure side heat exchanger configured to heat a heat medium by heat exchange between the high-pressure side refrigerant of the refrigeration cycle and the heat medium;
a second heat medium circuit in which the heat medium heated by the high-pressure side heat exchanger circulates;
a temperature sensor disposed in the first heat medium circuit and configured to detect a temperature of the heat medium flowing out of the low-pressure side heat exchanger;
a valve disposed between the first heat medium circuit and the second heat medium circuit and configured to couple or separate the first heat medium circuit and the second heat medium circuit; and
a switching device including a controller configured to control the valve to switch a mode between a communicating mode in which the first heat medium circuit and the second heat medium circuit are coupled and a non-communicating mode in which the first heat medium circuit and the second heat medium circuit are not coupled, wherein
the switching device includes:
a first switching valve that switches a flow of the heat medium so as to allow the heat medium to flow from the second heat medium circuit to the first heat medium circuit in the communicating mode and prevent the heat medium from flowing from the second heat medium circuit into the first heat medium circuit in the non-communicating mode; and
a second switching valve that switches a flow of the heat medium so as to allow the heat medium to flow from the first heat medium circuit to the second heat medium circuit in the communicating mode and prevent the heat medium from flowing from the first heat medium circuit into the second heat medium circuit in the non-communicating mode, the switching device selects the communicating mode when the temperature of the heat medium detected by the temperature sensor is lower than a first predetermined temperature, and the switching device selects the non-communicating mode when the temperature of the heat medium detected by the temperature sensor is higher than or equal to a second predetermined temperature.

2. The vehicular heat management system according to claim 1, wherein the switching device couples the first heat medium circuit and the second heat medium circuit to allow the heat medium to flow from the second heat medium circuit to the low-pressure side heat exchanger in the communicating mode.

3. The vehicular heat management system according to claim 1, comprising a heat-absorption heat exchanger disposed in the first heat medium circuit, the heat-absorption heat exchanger performing heat exchange between the heat medium cooled by the low-pressure side heat exchanger and an outside air such that the heat medium absorbs heat, wherein the switching device couples the first heat medium circuit and the second heat medium circuit to allow the heat medium to flow from the second heat medium circuit to the heat-absorption heat exchanger in the communicating mode.

4. The vehicular heat management system according to claim 1, wherein the switching device couples the first heat medium circuit and the second heat medium circuit to allow the heat medium to flow from the high-pressure side heat exchanger to the first heat medium circuit in the communicating mode.

5. The vehicular heat management system according to claim 1, comprising an air-heating heat exchanger disposed in the second heat medium circuit, the air-heating exchanger performing heat exchange between the heat medium heated by the high-pressure side heat exchanger and air blown to a vehicle interior, thereby heating the blown air, wherein the switching device couples the first heat medium circuit and the second heat medium circuit to allow the heat medium to flow from the air-heating heat exchanger to the first heat medium circuit in the communicating mode.

6. The vehicular heat management system according to claim 1, further comprising an inter-circuit flow rate control device configured to reduce a flow rate of the heat medium, flowing from the second heat medium circuit to the first heat medium circuit, with increase in temperature difference obtained by subtracting the temperature of the heat medium that flows in the first heat medium circuit from the temperature of the heat medium that flows in the second heat medium circuit.

7. The vehicular heat management system according to claim 1, wherein the heat medium is an ethylene glycol-based antifreezing fluid.

8. A vehicular heat management system comprising:

a compressor configured to draw and discharge a refrigerant;

a high-pressure side heat exchanger configured to heat a first heat medium by heat exchange between the refrigerant discharged from the compressor and the first heat medium;

an expansion valve configured to decompress the refrigerant heat-exchanged in the high-pressure side heat exchanger;

a low-pressure side heat exchanger configured to cool a second heat medium by heat exchange between the refrigerant decompressed in the expansion valve and the second heat medium;

a heat-absorption heat exchanger that causes the second heat medium to absorb heat by heat exchange between the second heat medium cooled by the low-pressure side heat exchanger and air;

an introducing portion including a flow channel configured to introduce a heat amount of the first heat medium heated by the high-pressure side heat exchanger into the heat-absorption heat exchanger without communicating with the low-pressure side heat exchanger and without shutting off an inflow of the second heat medium cooled by the low-pressure side heat exchanger into the heat-absorption heat exchanger; and a controller configured to determine whether frost is adhered to the heat-absorption heat exchanger and increase the temperature of the first heat medium heated by the high-pressure side heat exchanger when it is determined that frost is adhered to the heat-absorption heat exchanger.

9. The vehicular heat management system according to claim 8, comprising an air-heating heat exchanger configured to heat air by using at least a part of a heat amount of the refrigerant discharged from the compressor.

10. The vehicular heat management system according to claim 9, comprising an air flow rate adjusting device including an air mix door configured to adjust a flow rate of air that passes through the air-heating heat exchanger, wherein the controller increases the temperature of the first heat medium heated by the high-pressure side heat exchanger by controlling the air flow rate adjusting device so as to reduce the flow rate of air that passes through the air-heating heat exchanger.

11. The vehicular heat management system according to claim 10, wherein the air mix door is configured to adjust a ratio between the flow rate of air that flows in the air-heating heat exchanger and a flow rate of air that flows to bypass the air-heating heat exchanger.

12. The vehicular heat management system according to claim 9, comprising a three-way valve configured to adjust a ratio between a flow rate of the first heat medium that flows in the air-heating heat exchanger and a flow rate of the first heat medium that flows to bypass the air heating heat exchanger, wherein the controller increases the temperature of the first heat medium heated by the high-pressure side heat exchanger by controlling the three-way valve to decrease a ratio of the flow rate of the first heat medium that flows in the air heating heat exchanger and increase a ratio of the flow rate of the first heat medium that flows to bypass the air heating heat exchanger.

13. The vehicular heat management system according to claim 8, wherein the controller is configured to increase the temperature of the first heat medium heated by the high-pressure side heat exchanger with decrease in temperature of the second heat medium cooled by the low-pressure side heat exchanger when it is determined that frost is adhered to the heat-absorption heat exchanger.

14. The vehicular heat management system according to claim 8, comprising a temperature sensor configured to detect the temperature of the second heat medium.

15. The vehicular heat management system according to claim 14, wherein the controller determines whether frost is adhered to the heat-absorption heat exchanger on the basis of the temperature of the second heat medium detected by the temperature sensor.

16. The vehicular heat management system according to claim 14, wherein when the controller determines that frost is adhered to the heat-absorption heat exchanger, the controller calculates a required heat medium temperature, which is a temperature of the first heat medium required for melting the frost adhered to the heat-absorption heat exchanger, on the basis of the temperature of the second heat medium detected by the temperature sensor, and the controller brings the temperature of the first heat medium heated by the high-pressure side heat exchanger closer to the required heat medium temperature.

17. The vehicular heat management system according to claim 8, comprising a refrigerant pressure detecting device configured to detect a pressure of the refrigerant that has been exchanged heat in the low-pressure side heat exchanger.

18. The vehicular heat management system according to claim 17, wherein the controller determines whether frost is adhered to the heat-absorption heat exchanger on the basis of a pressure of the refrigerant detected by the refrigerant pressure detecting device.

19. The vehicular heat management system according to claim 17, wherein when the controller determines that frost is adhered to the heat-absorption heat exchanger, the controller calculates a required heat medium temperature, which is a temperature of the first heat medium required for melting the frost adhered to the heat-absorption heat exchanger, on the basis of the refrigerant pressure detected by the refrigerant pressure detecting device, and the controller brings the temperature of the first heat medium heated by the high-pressure side heat exchanger closer to the required heat medium temperature.

20. The vehicular heat management system according to claim 8 comprising a refrigerant temperature detecting device configured to detect a temperature of the refrigerant decompressed by the expansion valve, a temperature of the refrigerant that has been exchanged heat in the low-pressure side heat exchanger, or a temperature of the coolant drawn into the compressor.

21. The vehicular heat management system according to claim 20, wherein the controller determines whether frost is adhered to the heat-absorption heat exchanger on the basis of the temperature of the coolant detected by the refrigerant temperature detecting device.

22. The vehicular heat management system according to claim 20, wherein when the controller determines that frost is adhered to the heat-absorption heat exchanger, the controller calculates a required heat medium temperature, which is a temperature of the first heat medium required for melting the frost adhered to the heat-absorption heat exchanger, on the basis of a refrigerant temperature detected by the refrigerant temperature detecting device, and the controller brings the temperature of the first heat medium heated by the high-pressure side heat exchanger closer to the required heat medium temperature.

23. The vehicular heat management system according to claim 8, comprising a heater configured to supply heat to the first heat medium, wherein
when the controller determines that frost is adhered to the heat-absorption heat exchanger, the controller is configured to increase the temperature of the first heat medium heated by the high-pressure side heat exchanger by controlling the heater to increase the heat amount supplied to the first heat medium to a heat amount that is relatively high compared with a heat amount supplied before a time point of the determination of adhesion of the frost to the heat-absorption heat exchanger.

24. The vehicular heat management system according to claim 1, wherein the low-pressure side heat exchanger and the high-pressure side heat exchanger communicate with each other through the first heat medium circuit and the second heat medium circuit in the communicating mode.

* * * * *